(12) United States Patent
Ochi et al.

(10) Patent No.: US 6,991,042 B2
(45) Date of Patent: Jan. 31, 2006

(54) WORKING MACHINE LIFTING DEVICE OF TRACTOR

(75) Inventors: Tomofumi Ochi, Osaka (JP); Takayuki Isogai, Osaka (JP); Keiichi Hayashi, Osaka (JP)

(73) Assignee: Yanmar Agricultural Equipment Co., Ltd. (JP)

( * ) Notice: Subject to any disclaimer, the term of this patent is extended or adjusted under 35 U.S.C. 154(b) by 0 days.

(21) Appl. No.: 10/793,229

(22) Filed: Mar. 5, 2004

(65) Prior Publication Data

US 2004/0200624 A1 Oct. 14, 2004

Related U.S. Application Data

(63) Continuation of application No. PCT/JP03/04375, filed on Apr. 4, 2003.

(30) Foreign Application Priority Data

| Apr. 11, 2002 | (JP) | ................................. 2002-109159 |
| Oct. 2, 2002 | (JP) | ................................. 2002-289475 |

(51) Int. Cl.
*A01B 59/043* (2006.01)

(52) U.S. Cl. .................................................... 172/439

(58) Field of Classification Search ............... 172/2–12, 172/272, 273, 439–451; 280/124.104, 124.111, 280/124.138, 124.139, 124.141, 124.142; 180/348, 359–361, 900
See application file for complete search history.

(56) References Cited

U.S. PATENT DOCUMENTS

| 4,397,359 | A | * | 8/1983 | Price et al. ................. 172/430 |
| 4,499,775 | A | * | 2/1985 | Lasoen .................... 73/862.57 |
| 4,519,623 | A | * | 5/1985 | Orthman ..................... 172/439 |
| 4,601,346 | A | * | 7/1986 | Gregorio ....................... 172/7 |
| 6,044,915 | A | * | 4/2000 | Schlegel et al. ............ 172/439 |

OTHER PUBLICATIONS

JP Publication No.: 44–10722, Date of Publication: May 19, 1969.
Patent Abstracts of Japan. Publication No.: 08–112006, Date of Publication: May 7, 1996; Title: Working Machine–Connecting Structure of Tractor For Agriculture.
Patent Abstracts of Japan. Publication No.: 09–327207, Date of Publication: Dec. 22, 1997; Title: Tractor.
Patent Abstracts of Japan. Publication No.: 2000–092912, Date of Publication: Apr. 4, 2000; Title: Tractor.

* cited by examiner

*Primary Examiner*—Robert E Pezzuto
(74) *Attorney, Agent, or Firm*—Sterne, Kessler, Goldstein & Fox, P.L.L.C.

(57) ABSTRACT

A working machine lifting device of a tractor, comprising externally installed hydraulic lift cylinders disposed on the right and left sides of a transmission casing, lift arms rotated by the operation of the cylinders, and lower links vertically rotated by the rotation of the lift arms and connected to a working machine, wherein the cylinder and the lower link are rotatably supported on a same pin supported by the transmission casing and a sway chain bracket, and the support point of the cylinder and the vertical rotating pivot of the lower link are positioned on the axis of the pin.

18 Claims, 20 Drawing Sheets

WORKING MACHINE LIFTING DEVICE OF TRACTOR

Continuation of prior PCT application No.: PCT/JP03/04375, filed Apr. 4, 2003

TECHNICAL FIELD

The invention relates to a working machine lifting device disposed on a tractor body, and particularly relates to that having an externally installed hydraulic cylinder serving as a working machine lifting actuator.

BACKGROUND ART

Conventionally, a working vehicle such as a tractor provided at is rear portion with a working machine coupling linkage, usually including a single top link and a pair of left and right lower links, through which a working machine can be attached to the vehicle. The working machine coupling linkage is provided with a working machine lifting device which operates an actuator such as a hydraulic cylinder so as to lift and lower a working machine.

The hydraulic actuator (lift cylinder) is installed in a housing mounted on a transmission casing. A piston rod of the lift cylinder is connected to the right and left lower links via lift arms for lifting a working machine so that a working machine is vertically moved by telescopic operation of the lift cylinder.

The above-mentioned working machine lifting device having the single hydraulic cylinder for lifting the working machine is short in strength and rigidity for lifting a wide or heavy working machine. Therefore, Japanese Patent Application Laid Open Gazette No. Hei 8-112006 advocates a technology in which two hydraulic cylinders serving as lift cylinders are externally installed at a rear portion of the vehicle body, and connected to the right and left lower links via lift arms and lift rods or a leveling hydraulic cylinder so as to vertically rotate the working machine.

This working machine lifting device has support points of bottom ends of the externally installed lift cylinders disposed above supporting pivots of the lower links to the tractor, i.e., on the rear side surface of the transmission casing, so as to prevent the externally installed lift cylinders for lifting a working machine from interfering with the working machine coupling three-point linkage including the single top link and two lower links. However, in this arrangement, both ends of each lift cylinder (one is a basal end of its cylinder casing, and the other is a tip of its piston rod) are pivoted on two respective points (one on an intermediate portion of the lift arm, and the other on the rear side surface of the transmission casing) with such a short distance therebetween as to be restrictive in arranging the externally installed lift cylinder having a large capacity or a large stroke.

To enable the large capacity or stroke lift cylinders to be externally installed, an arrangement of lowering the pivots of the cylinders onto the transmission casing is conceivable. To prevent the externally installed lift cylinders from interfering with the working machine coupling linkage, another arrangement of shifting the pivots of the lower links onto the tractor into rear of the transmission casing is also conceivable. However, this arrangement increases the gap between the tractor and the working machine. Such a widened gap is undesirable in view of lengthwise balance of the tractor coupled with a working machine.

Further, each of the proposed arrangements requires that brackets and pins for supporting either the lower links or the bottom ends of the externally installed lift cylinders are disposed on the transmission casing or the like, thereby increasing the number of parts and manufacturing processes.

Further, a conventional valve device for the externally installed lift cylinders has a block bored by vertical holes and horizontal holes for passing oil between ports (detailed in the later "Best Mode for Carrying out the Invention" with reference of FIG. 9), thereby complicating and increasing its manufacturing processes. Additionally, the block must be thick so as to have the oil holes bored therein, thereby being heavy and expensive.

Further, in the conventional working machine lifting device, piston rods of the externally installed cylinders are exposed and subject to sticking or hitting of sand or mud causing damage and corrosion of their sliding surfaces. Therefore, as disclosed in Japanese Patent Application Laid Open Gazette No. 2000-92912, for example, the cylinder covers covering the outer periphery of the respective externally installed lift cylinders are fixed to the piston rods so as to protect the piston rods.

However, each of the disclosed cylinder covers is fixed to a bracket, which is formed on the top of the piston rod of the externally installed lift cylinder. Thus, a marketable hydraulic cylinder cannot serve as the externally installed hydraulic cylinder requiring to be processed for forming the bracket.

However, depending on the degree the cylinder cover may cover the cylinder, it may happen that earth and sand enters the gap between the cylinder and the cylinder cover. The disclosed conventional cylinder cover shaped along the rear, left and right peripheral surfaces of the cylinder is hard to exhaust earth and sand entering the gap between the cylinder cover and the cylinder.

BRIEF SUMMARY OF THE INVENTION

In a first aspect of the present invention, a working machine lifting device of a tractor comprises an externally installed hydraulic lift cylinder disposed on a side of a transmission casing, a lift arm rotated by operation of the cylinder, and a lower link vertically rotated by rotation of the lift arm and connected to a working machine. The supporting point of the cylinder and the vertically rotating pivot of the lower link are positioned coaxially to each other. Therefore, even if the externally installed cylinder has a large stroke or capacity, the tractor can be appropriately balanced in its lengthwise direction because of such extremely forward positioning of the support point of the lower link.

In the working machine lifting device of a tractor, preferably, the externally installed cylinder and the lower link are rotatably supported on a same pin so that the support point of the cylinder and the vertical rotating pivot of the lower link are positioned on the axis of the pin. Therefore, it is unnecessary to provide separate pins for pivoting the hydraulic cylinder and the lower link, thereby saving a parts count. Further, a space required to pivot the externally installed hydraulic cylinder and the lower link can be reduced so as to facilitate saving of spaces.

Preferably, the pin is supported by the transmission casing and a bracket of a sway chain for checking lateral swing of the lower link. Therefore, the pin is supported at its opposite ends so that the rigidity of the surrounding of the pin is enhanced, and the externally installed cylinder is allowed to have an enhanced operation force. Further, a part of the sway chain bracket is used as the supporting point of the pin, thereby reducing a parts count.

Preferably, the supporting point of the cylinder is disposed nearer to the transmission casing than the supporting position of the pin by the sway chain bracket, and wherein the vertically rotating pivot of the lower link is disposed farther from the transmission casing than the supporting position of the pin by the sway chain bracket. In this arrangement, the pin is provided with a retaining member adjacent to its tip portion so as to be prevented from escaping, and the pin can be easily removed from the lower link by removing a retaining member.

In a second aspect of the present invention, a working machine lifting device of a tractor comprises an externally installed hydraulic cylinder for lifting a working machine and controlling the attitude of it, a valve casing having a first surface, a hydraulic valve for supplying hydraulic oil to the cylinder, and a pipe disposed in the valve casing so as to communicate ports of the hydraulic valve to each other. Therefore, the valve casing can be simply formed therein with oil passages and the like to be connected to the hydraulic valve, thereby reducing manufacturing precesses and costs. Further, the freedom of piping can be enhanced so as to be advantageous in designing, and the valve casing does not need to be very thick, thereby being light-weighed.

Preferably, the pipe in the valve casing is disposed in a space formed in a second surface of the valve casing opposite to the first surface having the hydraulic valve thereon, thereby being disposed in parallel to the first surface and ensuring the compactness of the valve casing. Further preferably, the first surface is a top surface of the valve casing, and the second surface is a bottom surface of the valve casing, so that the piping can be applied to the arrangement of mounting the hydraulic valve on the top surface of the valve casing.

Preferably, a plurality of oil bores are formed in the valve casing between the first and second surfaces so as to be extended from the respective ports of the hydraulic valve, and wherein the pipe connects the oil bores to each other. The pipe can be desirably positioned by determining a desirable length of the pipe in this arrangement. Further preferably, if the first surface is the top surface of the valve casing and the second surface is the bottom surface of the valve casing, the oil bore is vertical and the pipe is horizontal, thereby providing a structure of port-to-port connection in the valve casing having the above-mentioned effect.

In a third aspect of the present invention, a working machine lifting device of a tractor comprises an externally installed hydraulic cylinder, a cylinder cover covering the outer periphery of the cylinder so as to protect the cylinder, a lift arm rotated by operation of the cylinder, the lift arm having a portion onto which an upper portion of the cylinder cover is attached, and a lower link vertically rotated by rotation of the lift arm and connected to a working machine. Therefore, the hydraulic cylinder requires no processing for connection with the cover, and a marketable hydraulic cylinder can be used as the cylinder, thereby saving costs.

In the working machine lifting device of a tractor, if the cylinder is cylindrical, preferably, the cylinder cover is substantially square when the cylinder is axially viewed. Therefore, on the diagonal line of the square shaped of the cylinder cover is ensured a considerably large gap between the cylinder and the cylinder cover facilitating for easy exhaust of contamination such as mad entering the cylinder cover.

Preferably, the cylinder cover is formed with a notch substantially parallel to the axial of the hydraulic cylinder. The lift arm can be passed in the notch so as to be prevented from interfering with the cylinder. Also, due to the notch, the cylinder cover can move in the direction other than the axial direction of the cylinder, or can be elastically expanded and contracted, thereby being prevented from being caught on the cylinder and frictionally sliding against the cylinder. Further, the notch facilitates for exhaust of contamination such as earth and sand entering in the cylinder cover.

Preferably, the notch having a substantially vertically reversed U-like shape and open downward is disposed below the cylinder cover. Therefore, the lower portion of the cylinder cover is so elastic as to prevent the cylinder cover and the cylinder from being caught on each other and frictionally sliding against each other, and to facilitate for exhaust of earth and sand entering the cylinder cover in association with the notch.

Preferably, an upper portion of the cylinder cover is cut so as to be prevented from interfering with the lift arm so that a position of the top end of the cut upper portion of the cylinder cover when abutting against the lift arm defines the limit of extension or contraction of a piston rod of the cylinder. The cylinder cover is prevented from interfering with the cylinder, and also serves as a stopper for the lift arm, thereby reducing a parts count.

In a fourth aspect of the present invention, a working machine lifting device of a tractor comprises an externally installed hydraulic cylinder, a cylinder cover covering the outer periphery of the cylinder so as to protect the cylinder, a lift arm rotated by operation of the cylinder, the lift arm having a portion onto which an upper portion of the cylinder cover is attached, and a lower link vertically rotated by rotation of the lift arm and connected to a working machine. Therefore, the lift arm and the piston rod can move relative to each other so as to reduce the stress onto the lift arm caused by the telescoping of the piston rod, and the stress onto the cylinder caused by the vertically rotating tendency of the lift arm when the working machine is vertically moved. The tip of the piston rod can smoothly slide in the slot via the roller. Such a desirable moderation effect is obtained.

Preferably, biasing means is disposed in the attaching portion so as to bias the roller toward the center of the slot, thereby preventing the piston rod and the lift arm from being caught on each other. Another effect is that the movement of the piston rod and the lift arm relative to each other is moderated so as to protect the hydraulic cylinder, the lift arm, the working machine, and so on from a sudden external force.

These, further and other objects, features and advantages of the present invention will appear more fully from the following description with reference to accompanying drawings.

BEST MODE OF CARRYING OUT THE INVENTION

At first, a tractor 100 equipped with a working machine lifting device 1 serving as a first embodiment of the working machine lifting device of the present invention will be described with reference to FIGS. 1 to 4.

Figure 1:
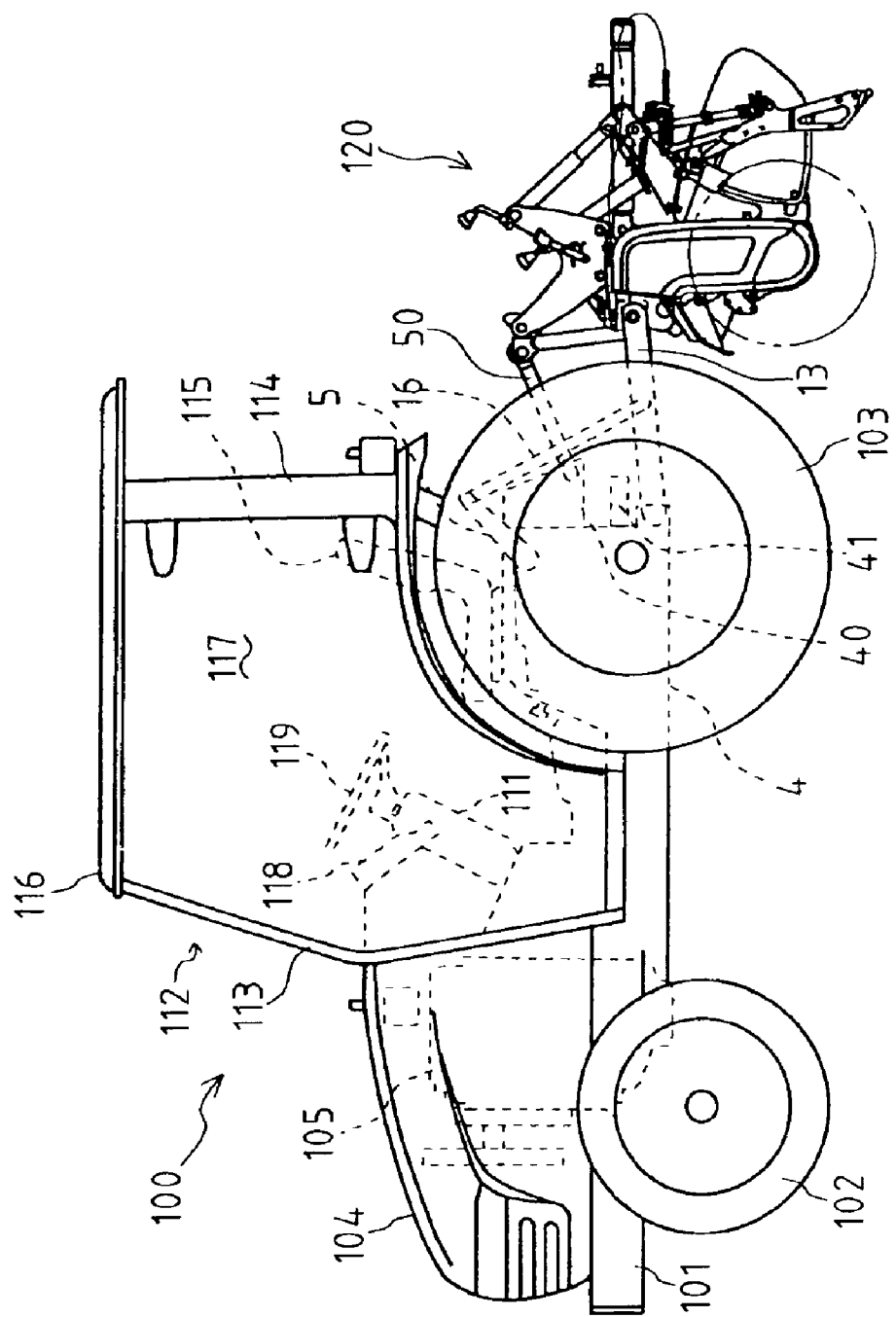
FIG. 1 is a left side view of a tractor to which the present invention is applicable.

As show in FIG. 1, tractor 100 has an engine frame 101 supporting a pair of front wheels 102 via a front axle casing. A transmission casing 4 is disposed rearward from engine frame 101 with a clutch housing therebetween. Left and right rear wheels 103 are supported on both lateral sides of transmission casings via respective rear axle casings 10. A working machine 120 can be coupled to the rear portion of transmission casing 4 via a three-point linkage (working machine coupling three-point linkage) comprising a top link 50 and a pair of right and left lower links 13. A front wheel driving output shaft is extended forward from the lower front portion of transmission casing 4 so as to drive right and left front wheels 102 via universal joints, a transmission shaft, and others.

An engine 105 is mounted on engine frame 101 and covered with a bonnet 104. A dashboard 111 is disposed behind bonnet 104. An instrument panel 118 and a steering wheel 119 are disposed over dashboard 111. A driver's seat 115 is disposed behind dashboard 111. A driver's unit including dashboard 11 and seat 115 is incorporated in a cabin 112.

Cabin 112 is provided with a cabin frame comprising front struts 113 erected from engine frame 101, rear struts 114 erected from transmission casing 4, and beams spanned at the top portion thereof. Cabin 112 is covered with a roof 116 at its ceiling, with a front glass at its front surface, with doors at its side surfaces, and with a rear glass at its rear surface.

Figure 2:
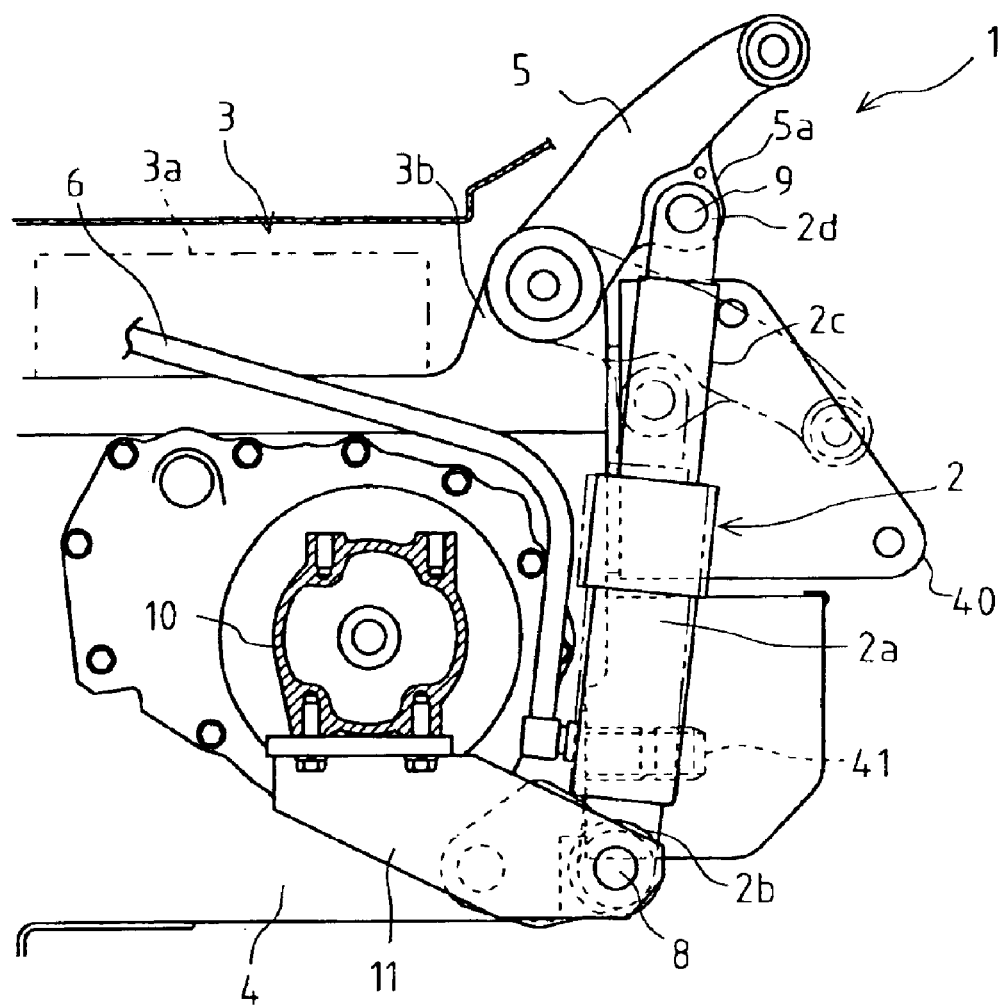
FIG. 2 is a left side view of a working machine lifting device having externally installed hydraulic lift cylinders according to a first embodiment of the present invention.
Figure 4:
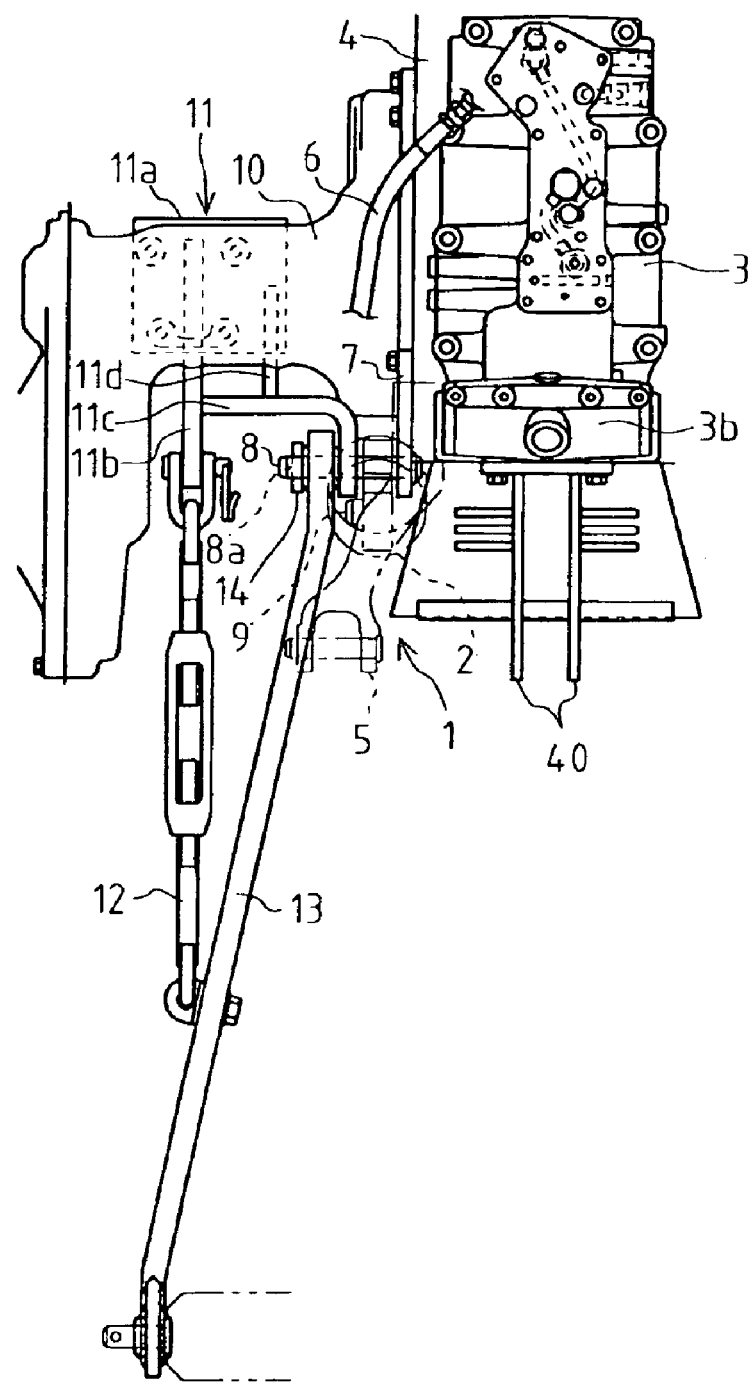
FIG. 4 is a plan view of the working machine lifting device according to the first embodiment of the present invention.

As shown in FIGS. 2 and 4, the working machine lifting device 1 comprises a pair of right and left externally installed hydraulic cylinders serving as lift cylinders 2 (right lift cylinder 2 is not shown), a hydraulic valve casing 3, a hydraulic valve 20 mounted on valve casing 3, and hydraulic piping connecting hydraulic valve 20 to the lift cylinders.

Hydraulic valve casing 3 is fixed by bolting or the like onto the top surface of transmission casing 4 at the rear portion of tractor 100. The top surface of hydraulic valve casing 3 serves as a valve mounting surface 3a. The rear portion of hydraulic valve casing 3 serves as a lift arm pivoting portion 3b, onto which a pair of right and left lift arms 5 (right lift arm 5 is not shown) are vertically rotatably connected at their (front basal) ends.

As shown in FIG. 1, lift rods 16 are extended from respective rear ends of right and left lift arms 5, and connected to respective intermediate portions of right and left lower links 13. Each lower link 13 can be coupled at its rear end to working machine 120. On the other hand, each lower link 13 is pivoted at its front end onto a lower area of each of right and left side surfaces of transmission casing 4, as discussed later. Accordingly, each lower link 13 is vertically rotated centered on its front end by vertically rotating each of right and left lift arms 5 via each lift rod 16.

Figure 3:
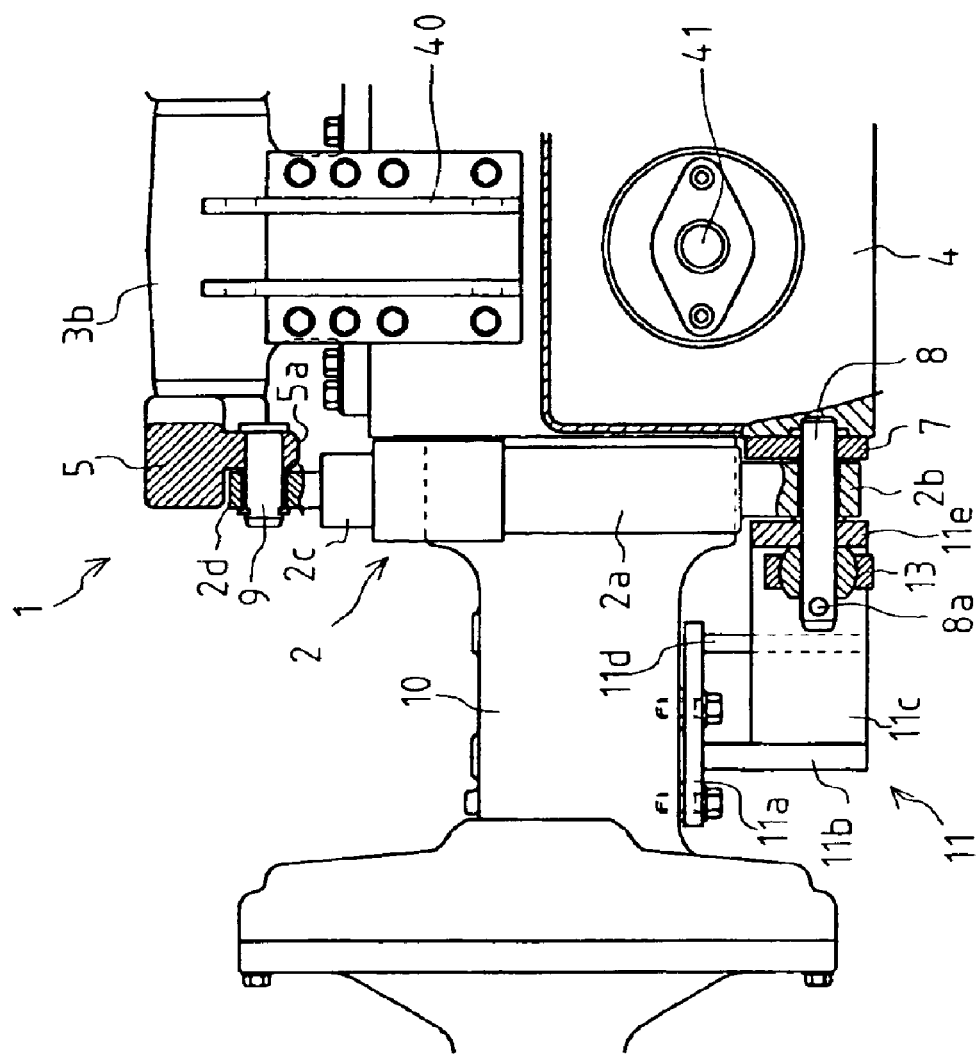
FIG. 3 is a rear view of the working machine lifting device according to the first embodiment of the present invention.

Since the configure of working machine lifting device 1 is laterally symmetrical, FIGS. 2 to 4 illustrate only the left portion of working machine lifting device 1 in which lift arm 5, lift cylinder 2 and others are disposed, and they do not illustrate the right portion thereof. Hereinafter, each of the right and left portions of working machine lifting device 1 will be described on the assumption that the illustrated left portion of working machine lifting device 1 represents the right portion thereof unless any member in the right portion is mentioned specially. A later-discussed working machine lifting device 15 serving as a second embodiment of the working machine lifting device will be described similarly in the state that FIG. 6 and others illustrate only the left portion thereof.

Lift cylinder 2 comprises a cylinder casing 2a, a pivoted portion 2b on the casing side, a piston rod 2c, and a pivoted portion 2d on the rod side. A hydraulic oil pipe 6 is connected at one end thereof to a side surface of cylinder casing 2a, and at the other end thereof to a lifting hydraulic valve fixed on the top surface of hydraulic valve casing 3. The hydraulic valve is switched to telescopically operate the piston rods of lift cylinders 2.

As shown in FIGS. 2 to 4, a top link bracket 40 is fixed onto transmission casing 4 and a rear surface of hydraulic valve casing 3 at a substantially lateral middle portion between right and left lift cylinders 2, so as to enable the front end of top link 50 to be connected thereto. Lift cylinders 2 are disposed forward from the rear end of top link bracket 40 and overlapped with top link bracket 40 when viewed in side, thereby saving its arrangement space in the lengthwise direction of the tractor.

A PTO shaft 41 projects rearward from the rear surface of transmission casing 4 below top link bracket 40.

As shown in FIG. 3, a pin-fixture bracket 7 is disposed on the lower area of each of right and left side surfaces of transmission casing 4. Pins 8 project from respective brackets 7 in the lateral direction of tractor 100. Pivoted portions 2b of lift cylinders 2 are freely provided on respective pins 8. As shown in FIG. 2, pivoted portion 2d of each lift cylinder 2 is pivotally connected to a downward protrusion 5a formed on a substantially longitudinal middle portion of each lift arm 5 via a pin 9.

Due to this construction, when piston rod 2c of lift cylinder 2 is extended by operation of the lifting hydraulic valve, left arms 5 are rotated upward so as to rotate lower links 13 upward via lift rods 16, thereby lifting up working machine 120.

As best shown in FIG. 3, a sway chain bracket 11 is fixed onto the bottom surface of each of right and left rear axle casings 10 projecting laterally from transmission casing 4. Each pin 8 is passed through a pin-supporting hole 11e of each sway chain bracket 11, and each lift cylinder 2 is rotatably supported on pin 8 between brackets 7 and 11.

In the present embodiment, pivoted portion 2b of lift cylinder 2 on the casing side is pivoted on pin 8 toward transmission casing 4, and pivoted portion 2d of lift cylinder 2 on the rod side is pivotally connected to fixed portion 5a of lift arm 5. Alternatively, if pivoted portion 2d of lift cylinder 2 on the rod side is pivoted on pin 8, and pivoted portion 2b of lift cylinder 2 on the casing side is pivotally connected to fixed portion 5a of lift arm 5, a similar effect can be ensured.

Figure 5:
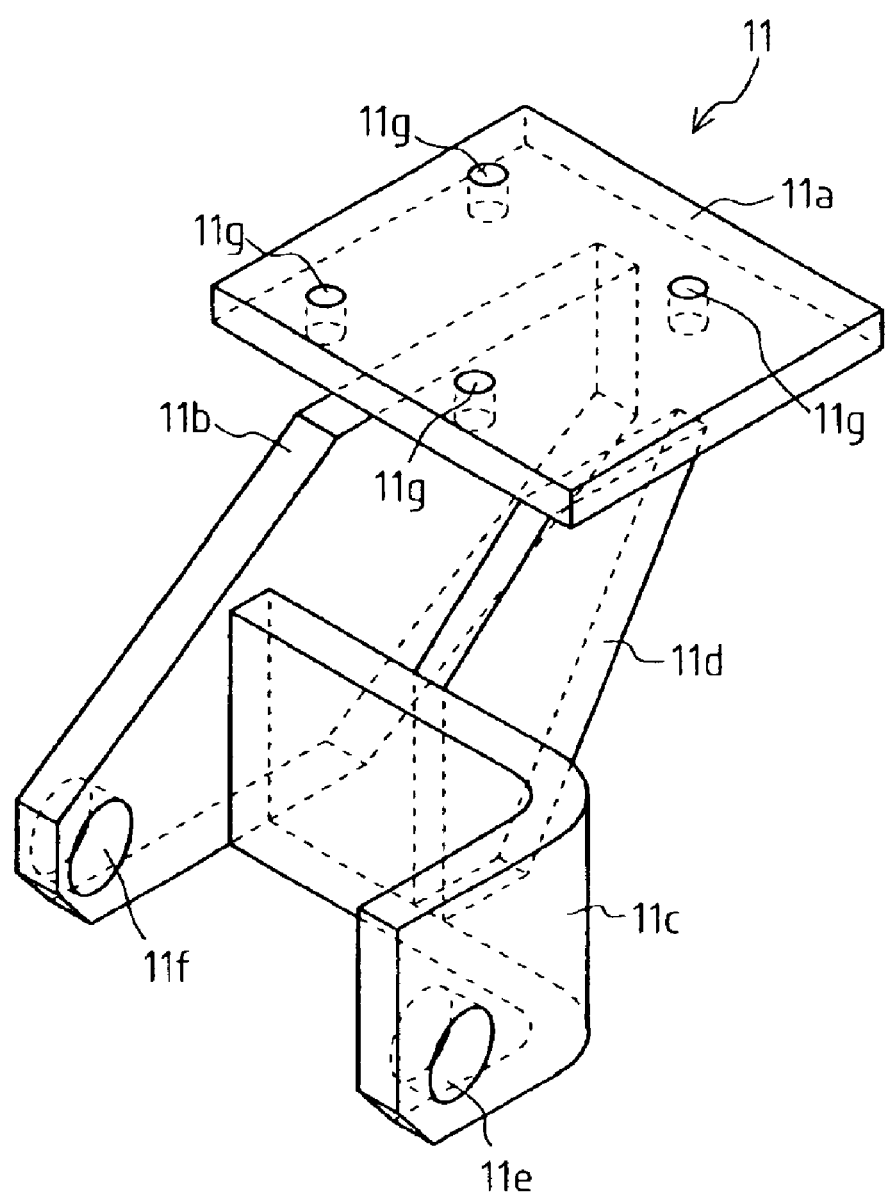
FIG. 5 is a perspective view of a sway chain bracket applied to the working machine lifting device according to the present invention.

As shown in FIG. 5, sway chain bracket 11 mainly comprises a basic part 11a, a first bracket part 11b, a second bracket part 11c and a reinforcement part 11d. These parts are assembled together by welding or the like so as to constitute sway chain bracket 11. FIG. 5 illustrates only left one of right and left symmetrical sway chain brackets 11.

A horizontally placed plate serves as basic part 11a. First bracket part 11b and reinforcing part 11d are fixed to the bottom surface of basic part 11a by welding or another manner so as to be extended downwardly rearward from the bottom surface of basic part 11a. Basic part 11a is provided therethrough with a plurality of bolt holes 11g, through which bolts are screwed, thereby being fixed to the bottom surface of rear axle casing 10. Any alternative manner may be used for fixing basic part 11a to rear axle casing 10. A safety frame or the cabin frame is fixedly connected at its bottom basic portion to the top surfaces of right and left rear axle casings 10 vertically opposite to their surface to which basic parts 11a are fixed, thereby reinforcing rear axle casings 10 and enhancing the rigidity of sway chain brackets 11 fixed thereto.

First bracket 11b is bored at its rear end by a sway-chain-engaging hole 11f, into which a shackle or the like on the front end of a sway chain 12 for checking lateral swing of the lower link is engaged. Second bracket 11c is substantially L-like shaped when viewed in plan, and fixed at one end thereof to a longitudinally intermediate side surface of first bracket 11b. Second bracket 11c is bored at the other end thereof by a pin-supporting hole 11e, which is located coaxially to hole 11f. Pin 8 is passed through hole 11e, and also passed through a pin hole of bracket 7, thereby being supported by both brackets 11 and 7. Reinforcing part 11d is interposed between the bottom surface of basic part 11a and the front surface of second bracket 11c so as to enhance the rigidity of sway chain bracket 11.

A tip of each pin 8 penetrating hole 11e projects from hole 11e laterally outward of tractor 100. As shown in FIGS. 3 and 4, the front end of lower link 13 of the three-point linkage is vertically rotatably and slightly laterally rotatably supported on the projecting tip of pin 8. Since pin-supporting holes 11e and check-chain-engaging hole 11f are coaxial to each other, i.e., the pivot of vertical rotation of lower link 13 and the pivot of vertical rotation of sway chain 12 are coaxial to each other, lower link 13 and sway chain 12 can be vertically rotated without interfering with each other.

Sway chains 12 are engaged at rear ends thereof to respective intermediate portions of lower links 13 while the front ends of sway chains 12 are engaged to respective check chain brackets 11 as mentioned above. Accordingly, as shown in FIG. 4, in each of the right and left portions of working machine lifting device 1, lift cylinder 2 is disposed toward the vehicle center, i.e., inward from lower link 13, and sway chain 12 outward from lower link 13.

The following advantages exist in the above-mentioned attaching of each lift cylinder 2 for lifting a working machine to the tractor.

Due to that pivoted portion 2b of lift cylinder 2 serving as the supporting point of lift cylinder 2 onto the tractor (transmission casing 4) and the front end of lower link 13 serving as the pivot of lower link 13 to be connected to a working machine are disposed on the axis of pin 8 projecting from the side surface of transmission casing 4 sideward of tractor 100, a first advantage is that lift cylinder 2 and lower link 13 are extended from common pin 8 so as to be prevented from interfering with each other even if lower link 13 is vertically rotated by telescoping lift cylinder 2. Further, in comparison with the assumption that the supporting point of lift cylinder 2 onto the tractor (transmission casing 4) is disposed above the front end pivot of lower link 13, large capacity and stroke of the externally installed cylinder can be ensured. Furthermore, there is no problem of wrong lengthwise balance of tractor 100 with a short distance between tractor 100 and a working machine coupled thereto, which occurs when the supporting point of lift cylinder 2 onto the tractor is lowered to the level of front end of lower link 13 so as to ensure sufficient capacity and stroke of lift cylinder 2 and when the front end of lower link 13 is disposed behind the supporting point of externally installed lift cylinder 2 onto the tractor so as to be prevented from interfering with lift cylinder 2.

Due to that the front end pivot of lower link 13 to be connected to a working machine and the supporting point of lift cylinder 2 onto the tractor (in this embodiment, pivoted portion 2b on the casing side) are pivoted on same pin 8 projecting from the side surface of transmission casing 4 sideward of tractor 100, a second advantage is that separate pins are not required for the respective pivots, thereby saving a parts count. Further, the space for arranging lift cylinder 2 and lower link 13 can be reduced so as to facilitate saving spaces.

Due to that the pin 8 is supported at two points by pin-fixture bracket 7 disposed on the side surface of transmission casing 4 and sway chain bracket 11, and pivoted portion 2b of lift cylinder 2 serving as the supporting point of lift cylinder 2 is supported between the supporting points of pin 8, a third advantage is that the rigidity of surrounding of pin 8 is enhanced so as to allow increase of the operation force of lift cylinder 2. Further, a part of sway chain bracket 11 is used as the supporting point of pin 8, thereby reducing a parts count.

Due to that pivoted portion 2b of lift 2 serving as the supporting point of lift cylinder 2 is disposed nearer to transmission casing 4 than the position of sway chain bracket 11 supporting pin 8, and the front end pivot of lower link 13 is disposed farther from transmission casing 4 (i.e., adjacent to the tip of pin 8) than the position of sway chain bracket 11 supporting pin 8, a fourth advantage is that lower link 13 can be easily removed from tractor 100. More specifically, lower link 13 can be easily removed from pin 8 by removing a retaining pin 14 shown in FIG. 4 engaged in a through-hole 8a of pin 8 near its tip.

The shape of sway chain bracket 11 is not limited by this embodiment. Moreover, sway chain bracket 11 may be fixed to a position, such as the rear surface of rear axle casing 10 or the side surface of transmission casing 4, other than the bottom surface of rear axle casing 10.

Any means other than retaining pin 14 is allowed if it prevents escape of lower link 13 from pin 8. For example, pin 8 may be formed on its portion near its tip with an annular groove, into which a C-ring or E-ring is fitted.

Additionally, working machine lifting device 1 according to the first embodiment of the present invention, provided with the pair of right and left lift cylinders 2, can increase the force for lifting a working machine and has the following advantage.

The hydraulic oil piping is bifurcated on the downstream side of the valve (not shown) for lifting the lift arms disposed in the valve arranging space 3a on the top surface of hydraulic valve casing 3, and each of the two branching hydraulic oil piping lines is provided with a throttle valve and a relief valve and connected to a hydraulic oil pipe 6 of each of lift cylinders 2. Such arrangement of hydraulic piping enables individual control of telescoping respective lift cylinders 2. This means that working machine lifting device 1 also functions as a mechanism for leveling a working machine relative to a field even if tractor 100 is slanted relative to the field. Therefore, an additional mechanism for leveling a working machine is not required, and parts for constituting the mechanism can be saved.

Furthermore, illustrated lift cylinder 2 is a single-acting cylinder to which single hydraulic oil pipe 6 is connected, wherein a working machine is lowered by the gravity and the release of hydraulic oil from the cylinder following the gravity lowering. Alternatively, lift cylinders 2 may be double-acting cylinders. In this case, hydraulic oil pipes are connected to two respective top and bottom ports provided on the side surface of cylinder casing 2a, and have a switching valve therebetween. This arrangement can apply a positive lowering hydraulic force onto a working machine in additional to the gravity.

Next, a tractor equipped with a working machine lifting device 15 according to a third embodiment of the present invention will be described with reference to FIGS. 6 to 11.

Figure 6:
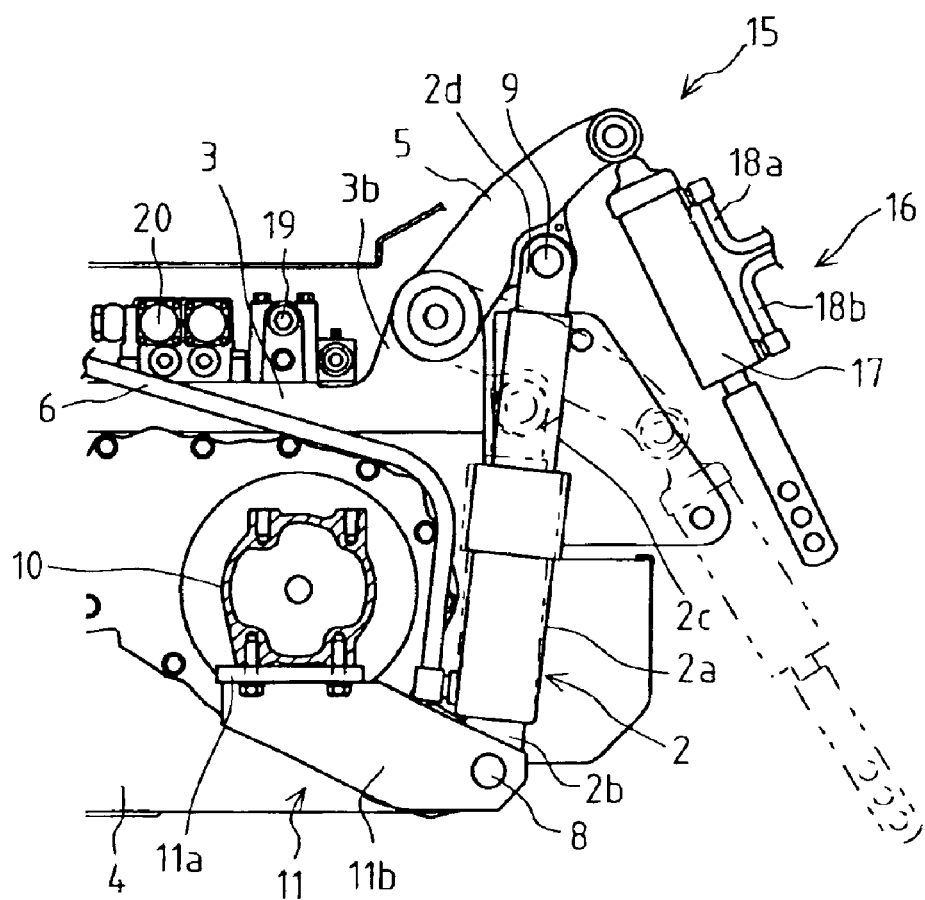
FIG. 6 is a left side view of a working machine lifting device having externally installed hydraulic lift cylinders and a hydraulic leveling cylinder according to a second embodiment of the present invention.
Figure 10:
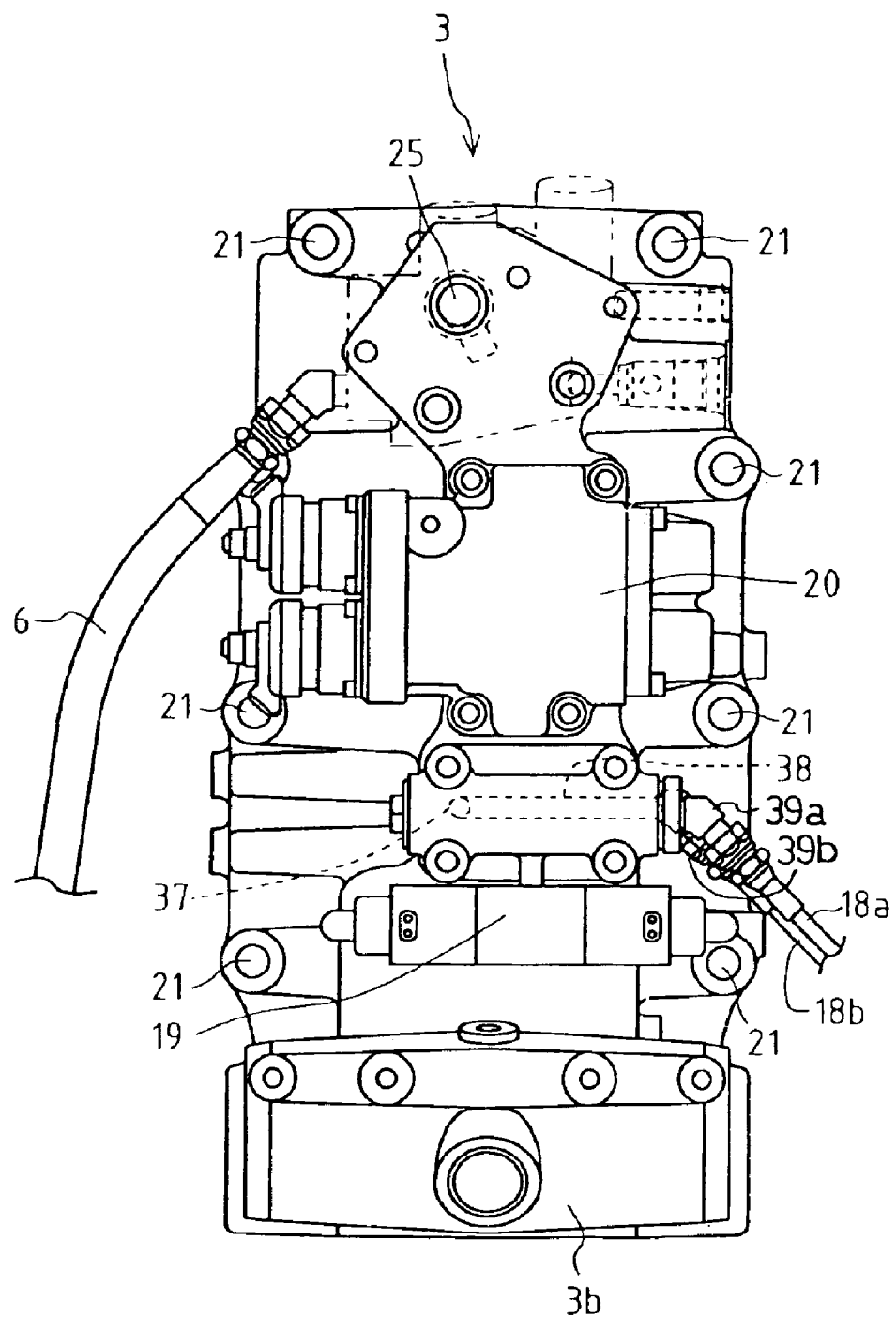
FIG. 10 is a plan view of piping from a flow control swing valve attached to the hydraulic valve casing shown in FIG. 7.

Working machine lifting device 15 of the second embodiment has a different mechanism for leveling working machine 120 while having the substantially similar arrangement of connecting lift cylinders 2 to respective lift arms 5 and transmission casing 4, in comparison with working machine lifting device 15 of the first embodiment. As shown in FIG. 6, a leveling cylinder 15 is interposed in lift rod 16 between either right or left lift arm 5 and lower link 13. In FIG. 6, leveling cylinder 16 appears being extended from left lift arm 5, however, this appearance is provided for only convenience. Namely, leveling cylinder 17 may be alternatively interposed between right lift arm 5 and right lower link 13. In FIG. 10, hydraulic oil pipes 18a and 18b to leveling cylinder 17 are extended rightward from hydraulic valve unit 3 so as to suit leveling cylinder 17 interposed between right lift arm 5 and right lower link 13. Alternatively, hydraulic oil pipes 18a and 18b may be extended leftward. The most important point is that leveling cylinder 17 is interposed in either right or left lift rod 16 (or leveling cylinders 17 are interposed in both lift rods 16, in some cases), and extension of hydraulic oil pipes 18a and 18b from hydraulic valve unit 4 suits such arranged leveling cylinder (cylinders) 17.

An electro-magnetic flow control swing valve 19 is disposed on hydraulic valve casing 3, and the pair of hydraulic oil pipes 18a and 18b are extended from electromagnetic flow control valve 19 to leveling cylinder 17. Leveling cylinder 17 is a double-acting cylinder with a cylinder casing provided on its side surface with top and bottom ports to be connected to respective hydraulic oil pipes 18a and 18b so as to bring hydraulic oil pipes 18a and 18b into communication with respective hydraulic oil chambers with a piston between in leveling cylinder 17.

The direction of hydraulic oil circulating between hydraulic oil pipes 18a and 18b is switched by operation of flow control swing valve 19, thereby telescoping leveling cylinder 17. Therefore, right and left links 13 can be changed in their tilt angle relative to the horizontal level so as to hold working machine 120 substantially horizontally or at a desired slant angle in relative to a field regardless of the pose of the main body of tractor 100.

Further, the second embodiment does not require the individual control of the extensions of right and left lift cylinders 2 as well as the first embodiment. Therefore, hydraulic devices for this control (such as a throttle valve on the downstream of a valve for lifting up the lift arm) can be saved. Furthermore, in the second embodiment, if a working machine is lightweight, one of right and left lift cylinders 2 may be omitted so that a single externally installed cylinder lifts the working machine. In this case, right and left arms 5 may be integrally connected to each other through a common pivot shaft.

The second embodiment requires hydraulic lift valve 20 for telescoping lift cylinder or cylinders 2 and flow control swing valve 19 for telescoping leveling cylinder 17. These hydraulic valves are disposed on the top surface of hydraulic valve casing 3.

Figure 7:
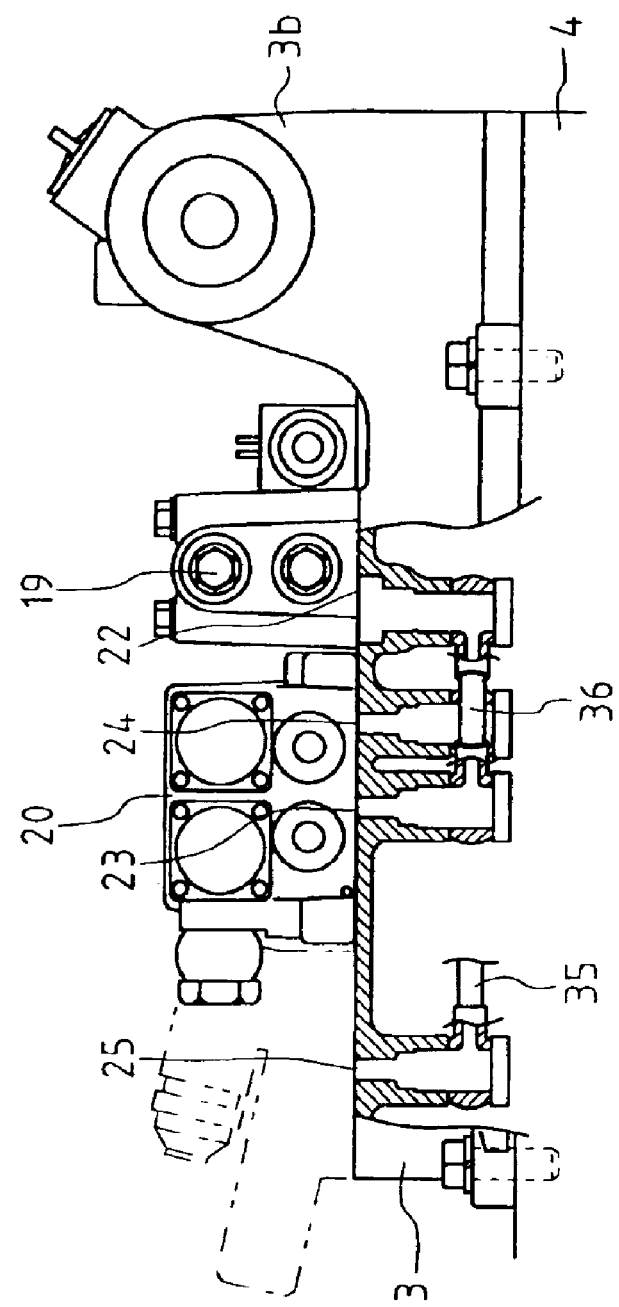
FIG. 7 is a left view partly in section of a hydraulic valve casing in the working machine lifting device according to the second embodiment of the present invention.
Figure 8:
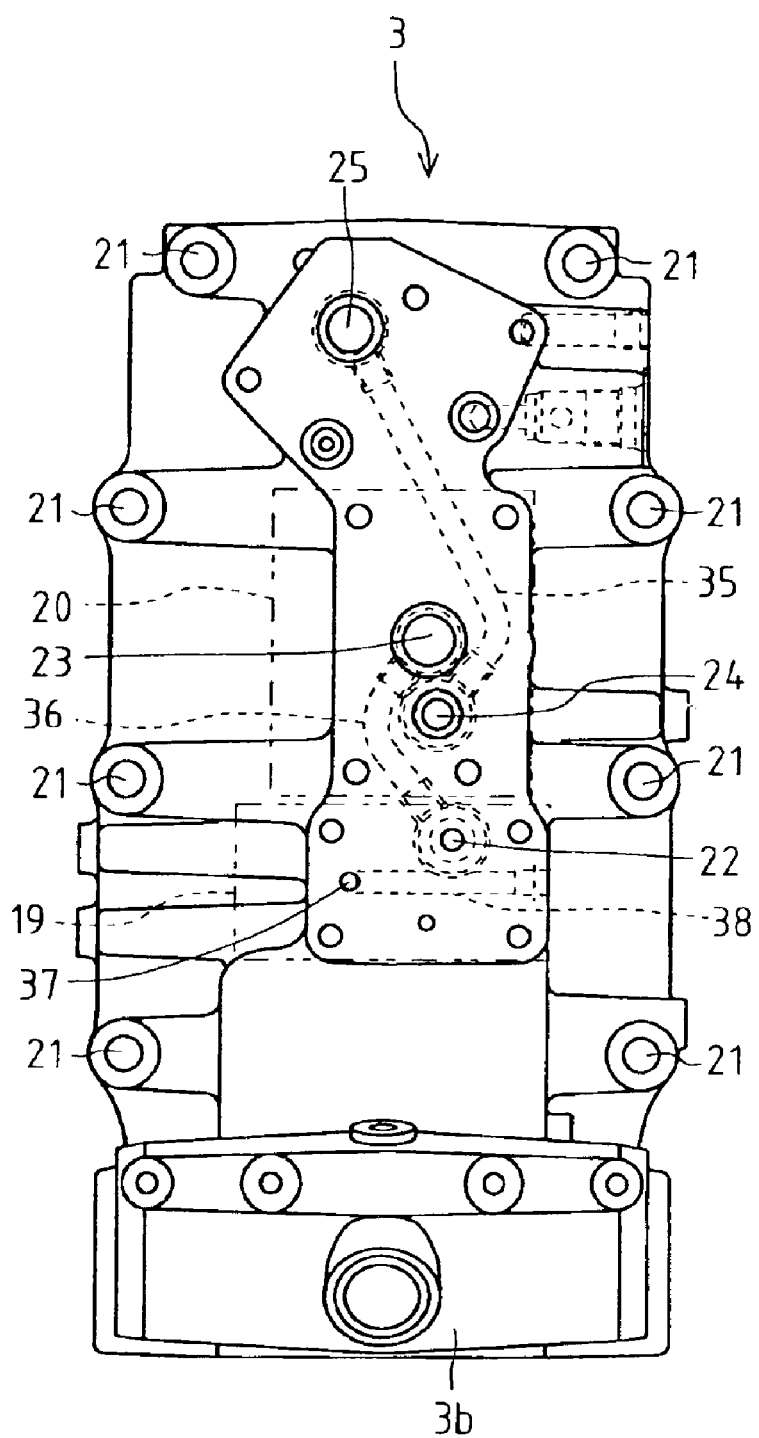
FIG. 8 is a plan view of the hydraulic valve casing shown in FIG. 7.

As shown in FIGS. 7 and 8, hydraulic valve casing 3 is shaped into a downwardly opened hollow box. Hydraulic valve casing 3 is provided with a plurality of bolt holes 21 open at the top surface thereof so as to be screwed onto the top surface of transmission casing 4. The rear portion of hydraulic valve casing 3 projects upward so as to form lift-arm-pivoting portion 3b onto which right and left lift arms 5 are vertically rotatably pivoted.

Furthermore, as shown in FIGS. 7 and 8, hydraulic lift valve 20 and flow control swing valve 19 are mounted on the top surface of hydraulic valve casing 3. The mounted valves 20 and 19 are provided with hydraulic oil ports open at their bottom surfaces in contact with hydraulic valve casing 3. Therefore, vertical oil bores 22, 23, 24 and 25 are open at the top surface of hydraulic valve casing 3 so as to coincide with the ports. The oil bores are extended so as to be open but plugged at the bottom surface of hydraulic valve casing 3. A horizontal pipe 35 connects hydraulic bores 24 and 25 to each other, and a horizontal pipe 36 connects hydraulic bores 22 and 23 to each other, so as to fluidly connect flow swing control valve 19 to hydraulic valve casing 3. The hollow space on the bottom surface of hydraulic valve casing 3 is used for arranging pipes 35 and 36.

Figure 9:
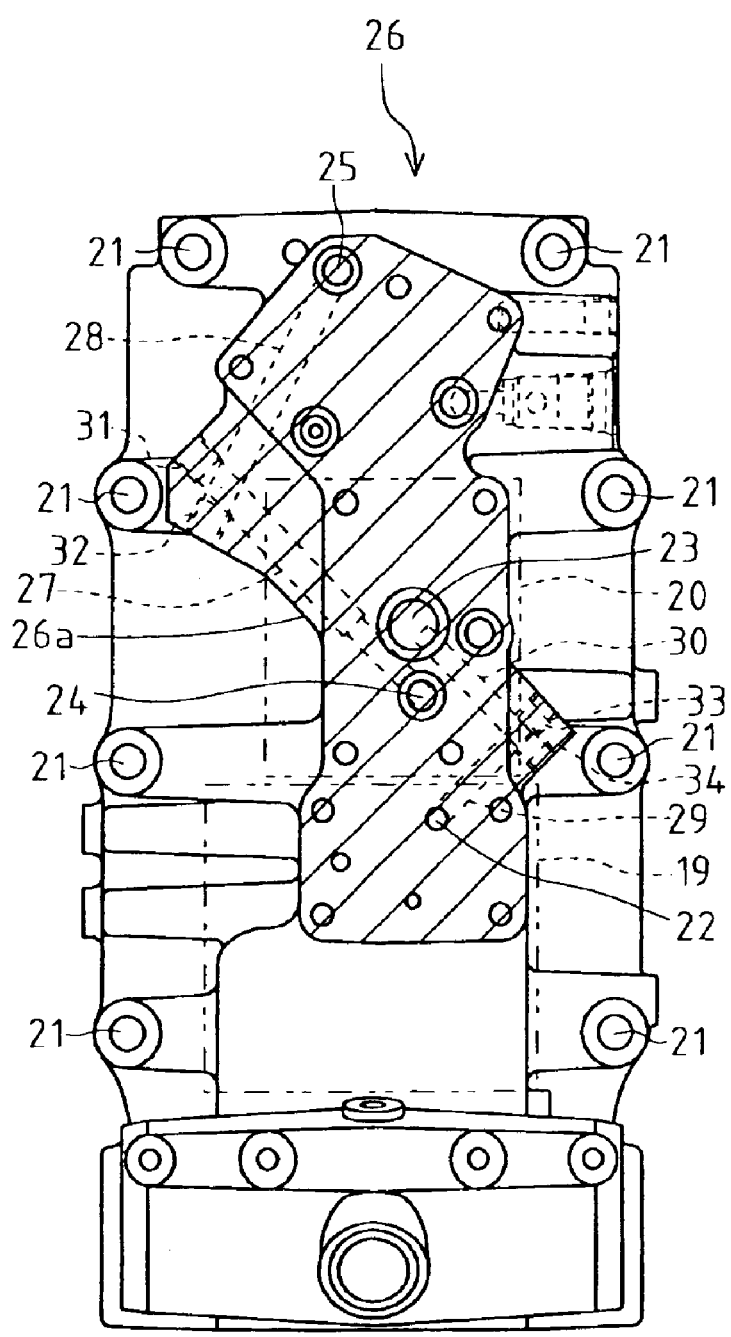
FIG. 9 is a plan view of a conventional hydraulic valve casing.

A conventional hydraulic valve casing 26, as shown in FIG. 9, has a thick center portion 26a (hatched in FIG. 9) bored by horizontal bores 27, 28, 29 and 30 open at its side surfaces. While vertical oil bores 24 and 25 are extended downward in hydraulic valve casing 26 from its top surface, horizontal oil bores 27 and 28 are connected to each other in center portion 26a and connected at their proximal ends to respective oil bores 24 and 25. Plugs 31 and 32 plug the respective openings of oil bores 27 and 28 at the side surfaces of center portion 26a so as to form an oil passage between oil bores 24 and 25.

Similarly, while vertical oil bores 22 and 23 are extended downward in hydraulic valve casing 26, horizontal oil bores 29 and 30 are connected to each other in center portion 26a and connected at their proximal ends to respective oil bores 22 and 23. Plugs 33 and 34 plug the respective openings of oil bores 29 and 30 at the side surfaces of center portion 26a so as to form an oil passage between oil bores 22 and 23.

Namely, conventional hydraulic valve casing 26 requires many processes of boring horizontal oil bores 27, 28, 29 and 30 therein from its side surfaces, and thick center portion 26a is heavy.

On the contrary, hydraulic valve casing 3 serving as a model of the present invention is provided with no horizontal oil bores but pipes 35 and 36 so as to mutually connect the vertical oil bores, thereby facilitating easy manufacturing and saving a processes count. The high degree of freedom in piping is advantageous in its designing. Hydraulic valve casing 3, which need not to be very thick, can be lighter than conventional hydraulic valve casing 26.

Next, a manner of connecting hydraulic oil pipings between flow control swing valve 19 and leveling cylinder 17 in working machine lifting device 15 will be described with reference to FIGS. 6, 10 and 11.

As mentioned above, double-acting leveling cylinder 17 requires two hydraulic oil pipes 18a and 18b flows hydraulic oil therein opposite to each other. On the other hand, electro-magnetic flow control swing valve 19 is provided with solenoid valves on its right and left sides so that pipe connectors to be connected to respective hydraulic oil pipes 18a and 18b are naturally distributed to the right and left sides. However, when the pair of laterally distributed pipe connectors are connected to respective hydraulic pipes 18a and 18b, hydraulic pipes 18a and 18b are extended from both right and left sides to leveling cylinder 17 on one of the right and left sides, thereby being complicated in piping.

Figure 11:
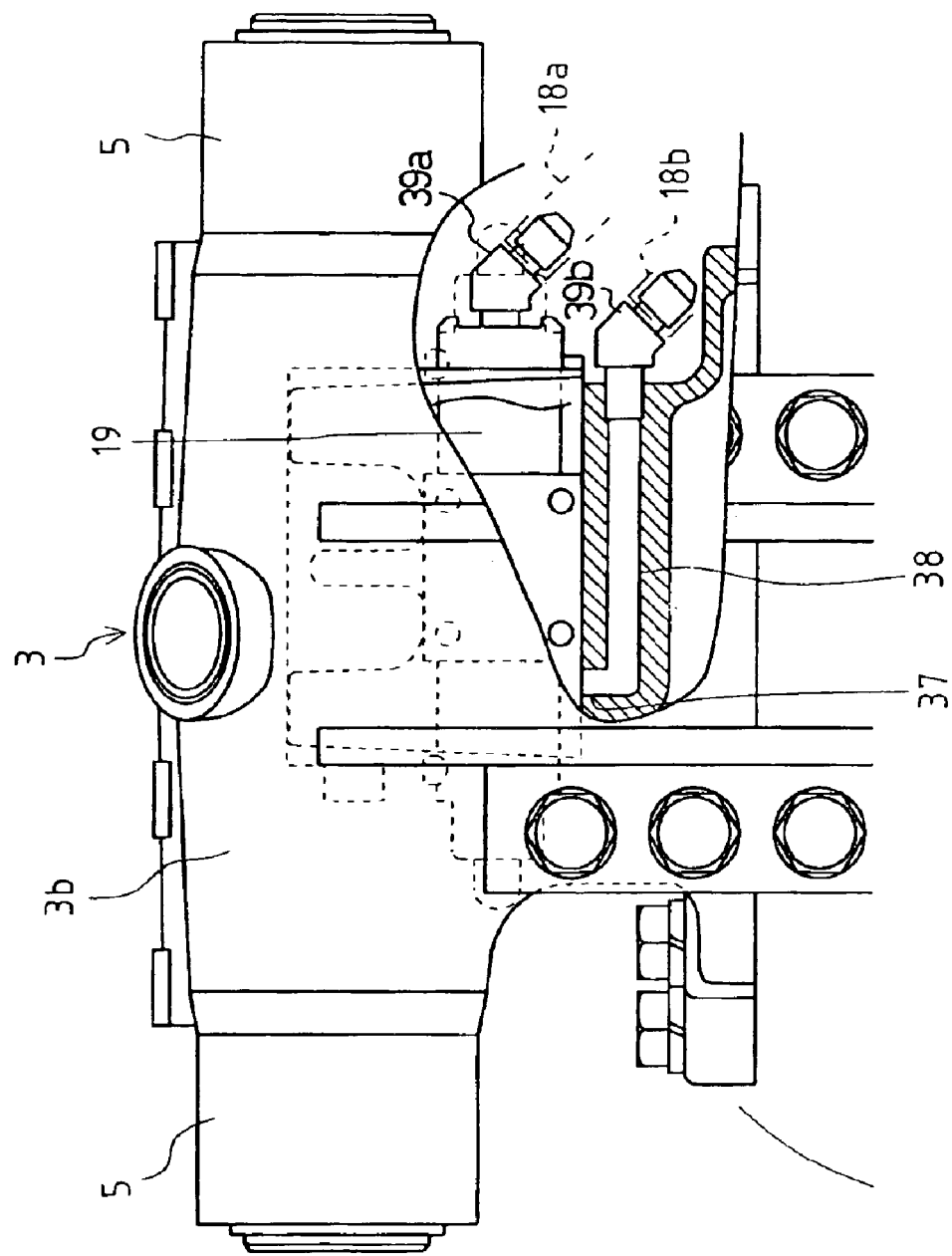
FIG. 11 is a rear view of partly in section of piping of the flow control swing valve.

Therefore, as best shown in FIGS. 10 and 11, in flow control swing valve 19 of hydraulic valve casing 3 as a model of the present invention, while a pipe connector 39a interposed between a first right or left (in this embodiment, right) port of the solenoid valve and hydraulic oil pipe 18a is disposed on the same right or left (in this embodiment, right) side of the first port, a pipe connector 39b interposed between the other second left or right (in this embodiment, left) port of the solenoid valve and hydraulic oil pipe 18b is disposed so as to plug an opening end of an oil bore 38 just under right pipe connector 39a, wherein, in the lower surface portion of hydraulic valve casing 3 just under flow control swing valve 19, a vertical oil bore 37 is extended downward from the second port and laterally horizontal oil bore 38 is extended from oil bore 37.

In this way, pipe connectors 39a and 39b are gathered on one of the right and left sides (in this embodiment, on the right side) so as to enable the pair of hydraulic oil pipes 18a and 18b to be bound into a bundle, thereby simplifying the hydraulic oil piping so that hydraulic oil pipes 18a and 18b can be connected to respective pipe connectors 39a and 39b substantially at once. Further, hydraulic oil pipes 18a and 18b are allowed to be as long as each other, thereby being standardized.

To establish simple and short piping, which of right and left sides of valve 19 pipe connectors 39a and 39b are disposed on preferably corresponds to which of right and left lift rods 16 leveling cylinder 17 is interposed in. In this meaning, pipe connectors 39a and 39b disposed on the right side of flow control valve 19 shown in FIG. 19 suit leveling cylinder 17 interposed in right lift rod 16 (between right lift arm 5 and lower link 13).

A cover for protecting lift cylinder 2 will be described with reference to FIGS. 12 to 15.

Figure 12:
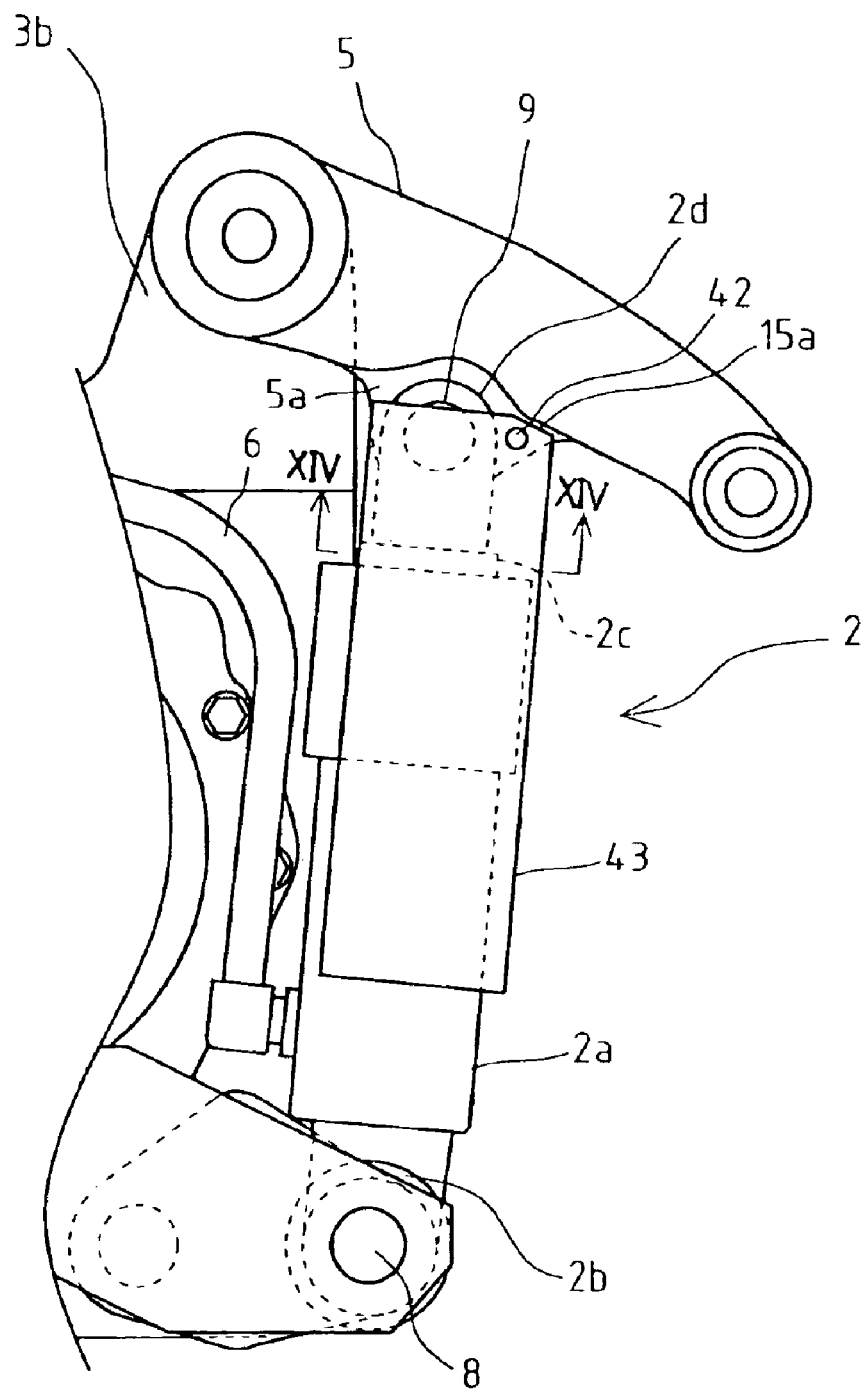
FIG. 12 is a side view of an externally installed hydraulic lift cylinder with a cylinder cover when the lift cylinder is contracted.
Figure 13:
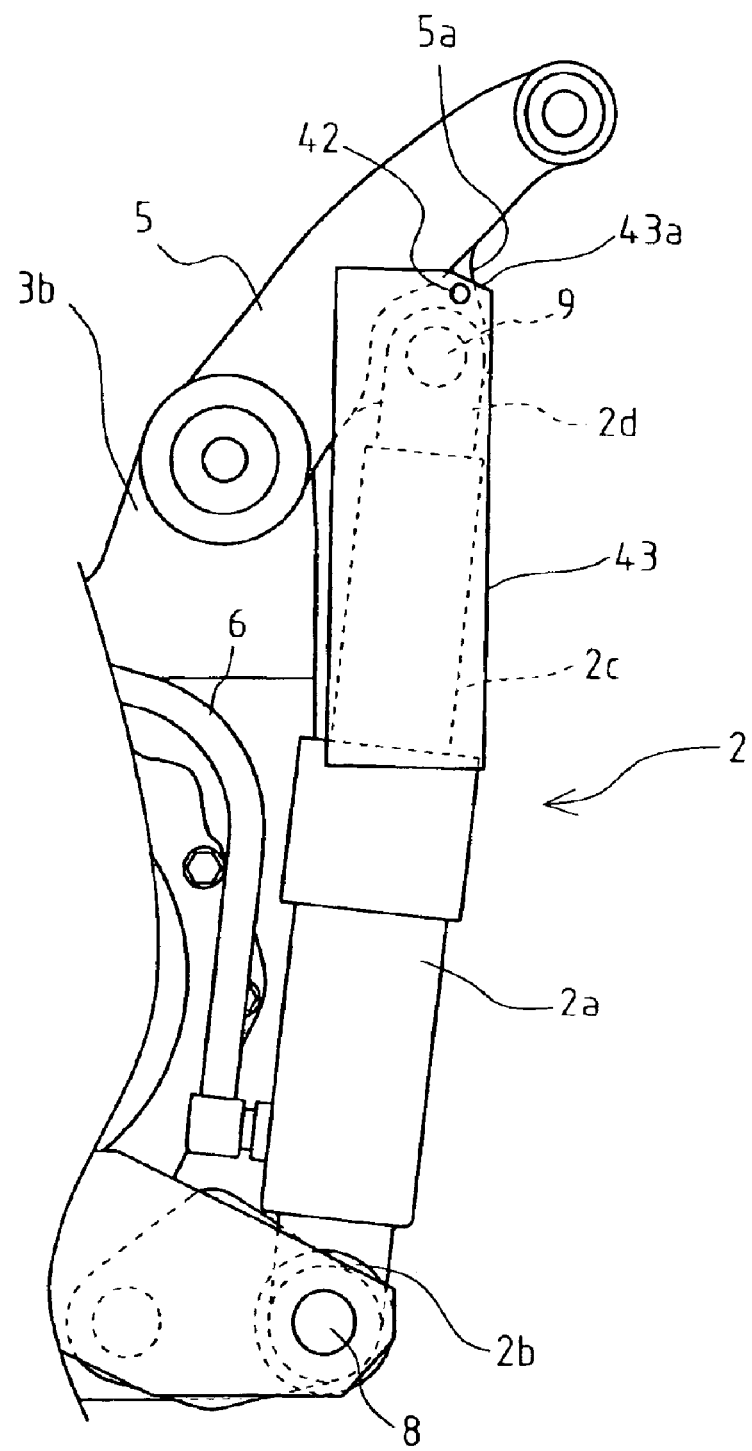
FIG. 13 is a side view of the lift cylinder when it is extended.
Figure 15:
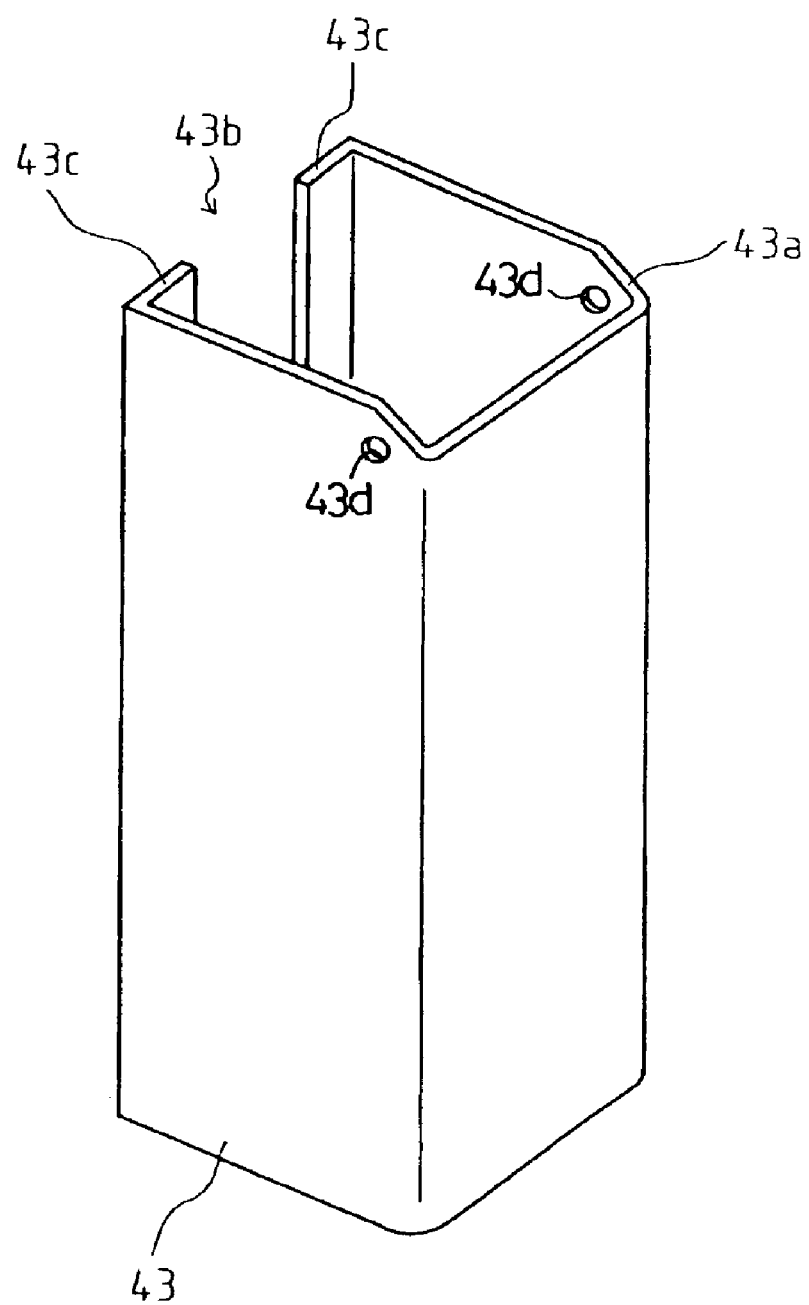
FIG. 15 is a perspective view of the cylinder cover shown in FIG. 12.

Each of lift arms 5 of working machine lifting devices 1 and 15 may be provided with a cylinder cover 43 for protecting lift cylinder 2. As shown in FIGS. 12 and 13, protrusion 5a of lift arm 5, onto which pivoted portion 2d of lift cylinder 2 on its rod side is pivotally connected, also serves as a portion pivoting cylinder cover 43. Protrusion 5a projects downward from the substantially longitudinally middle portion of lift arm 5. While protrusion 5a has a pivoting hole, cylinder cover 43 is provided with a pair of pivoting holes 43d as shown in FIG. 15. A pivoting member 42 is passed through these pivoting holes so as to pivot the top portion of cylinder cover 43 onto protrusion 5a of lift arm 5, whereby cylinder cover 42 covers the periphery of piston rod 2c (on its rear, right and left sides) so as to protect it.

Therefore, protrusion 5a on the substantially longitudinally middle portion of lift rod 5 serves as a portion onto which the tip of piston rod 2c (pivoted portion 2d) of lift cylinder 2 is pivoted, and also serves as a portion onto which the top portion of cylinder cover 43.

Cylinder cover 43 surely protects telescoping piston rod 2c. Also, cylinder cover 43, which is not integrally fixed to lift arm 5, vertically moves together with piston rod 2c along the axis of piston rod 2c. To realize this movement, cylinder cover 43 is not "fixed" but "pivoted" through pivoting member 42 onto protrusion 5a of lift arm 5.

The vertical length of cylinder cover 43 is ensured so as to cover the top end of cylinder casing 2a even if piston rod 2c is fully extended upward. Consequently, however degree piston rod 2c may be extended, piston rod 2c is not exposed, thereby being protected from sticking or hitting of earth and sand, and cylinder cover 43 is constantly supported by cylinder casing 2a.

Figure 14:
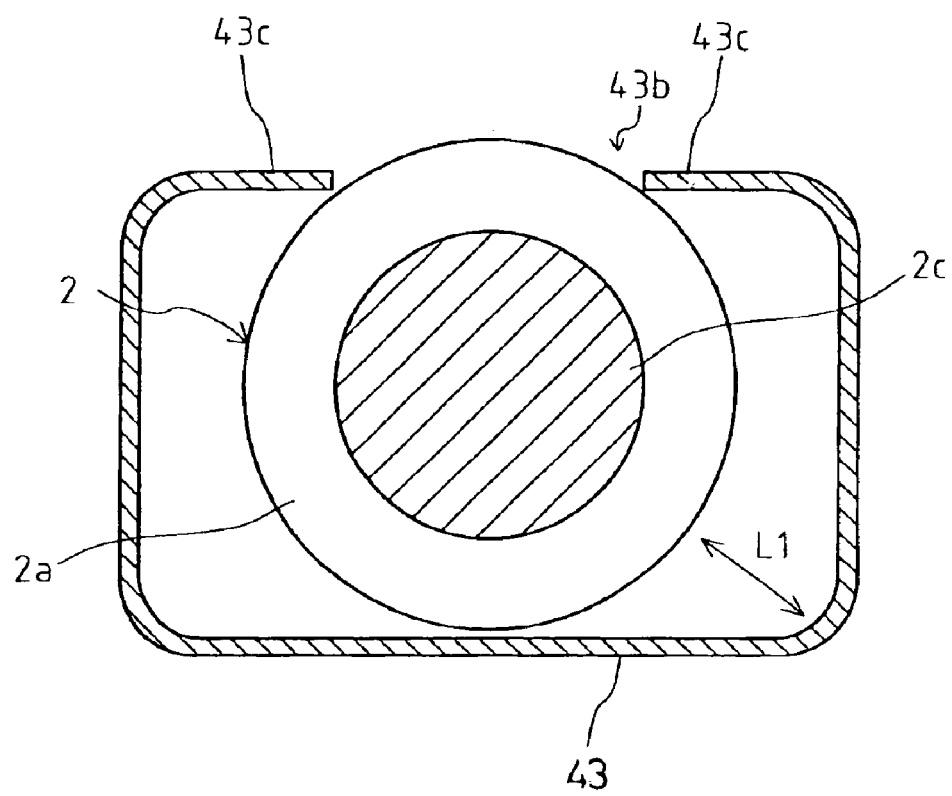
FIG. 14 is a cross sectional view taken in XIV—XIV line of FIG. 12.

The front surface of cylinder cover 43 is provided with a vertically through opening 43b at the substantially laterally middle portion thereof, as best shown in FIGS. 14 and 15. Left and right edges 43c of cylinder cover 43 with opening 43b therebetween abut against cylinder casing 2a of lift cylinder 2. Therefore, cylinder cover 43 does not slip off from the axial direction of lift cylinder 2, thereby sliding on cylinder casing 2a surely and smoothly. Consequently, cylinder cover 43 vertically moves substantially integrally with piston rod 2c according to telescoping of piston rod 2c.

Incidentally, the length of cylinder cover 43 is limited so as to prevent the bottom end of cylinder cover 43 from interfering with the portion pivoting the bottom end (pivoted portion 2d) of lift cylinder 2 (including sway chain bracket 11) while piston rod 2c is contracted downward to the limit, as shown in FIG. 12.

During the telescoping of piston rod 2c, the angle between telescoping piston rod 2c and rotating lift arm 5 changes. Considering it, cylinder cover 43 which moves substantially integrally with piston rod 2c must be configured to be prevented from interfering with lift arm 5.

More specifically, a portion of lift arm 5 behind pivoted portion 2d and piston rod 2c forms an angle, which is reduced when piston rod 2c is contracted downward and lift arm 5 is rotated downward. In this situation, the problem arises that the rear top end of cylinder cover 43 interferes with the rear portion of downwardly rotating lift arm 5. To prevent such interference, cylinder cover 43 has a cut rear top end portion 43a lower than its front top end, as shown in FIG. 15. As shown in FIG. 12, cut portion 43a is so formed as to abut against the lower surface of lift arm 5 when rotated lift arm 5 reaches its lower limit position, thereby serving as a stopper for lift arm 5.

On the other hand, a portion of lift arm 5 in front of pivoted portion 2d and piston rod 2c forms an angle, which is reduced when piston rod 2c is extended upward and lift arm 5 is rotated upward. In this situation, the problem arises that the rear top end of cylinder cover 43 interferes with the rear portion of downwardly rotating lift arm 5. To prevent such interference, front opening 43b of cylinder cover 43 is wide enough to have the front portion of upwardly rotating lift arm 5 pass therein when piston rod 2c is extended, as shown in FIG. 13.

In this way, front opening 43b of cylinder cover 43 serves as a guide for the sliding of cylinder cover 43 against lift cylinder 2, and also serves as an opening for preventing extended piston rod 2c from interfering with lift arm 5.

As understood from FIG. 13, cylinder cover 43 is actually slanted relative to the axis of lift cylinder 2 according to extension of piston rod 2c. However, opening 43b allows the lower portion of cylinder cover 43 to move in the fore-and-aft direction relative to cylinder casing 2a to some degree, whereby cylinder cover 43 angled relative to lift cylinder 2 is prevented from being caught on lift cylinder 2 to inhibit the extension of piston rod 2c. Further, cylinder cover 43 is also prevented from being caught on lift cylinder 2 by ensuring its considerable largeness in section.

Moreover, as shown in FIGS. 14 and 15, cylinder cover 43 is sectionally almost square when lift cylinder 2 is axially viewed, while cylinder casing 2a is cylindrical (sectionally almost circular). Considering it, even if the sectional area of cylinder cover 43 is the minimum required to ensure the free operation of lift cylinder 2, the sectional square shape of cylinder cover 43 has such a diagonal length as to ensure a gap of a distance L1 between cylinder cover 43 and cylinder casing 2a, which is large enough to easily exhaust earth and sand entering therein.

Figure 17:
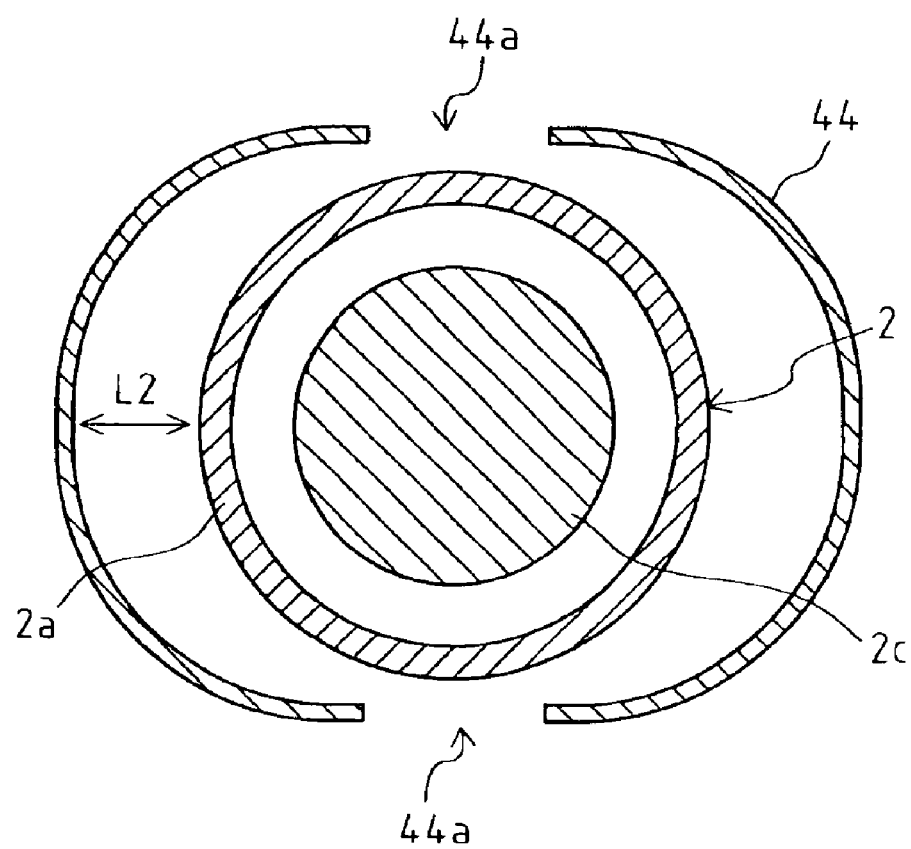
FIG. 17 is a cross sectional view taken in XVII—XVII line of FIG. 16.
Figure 18:
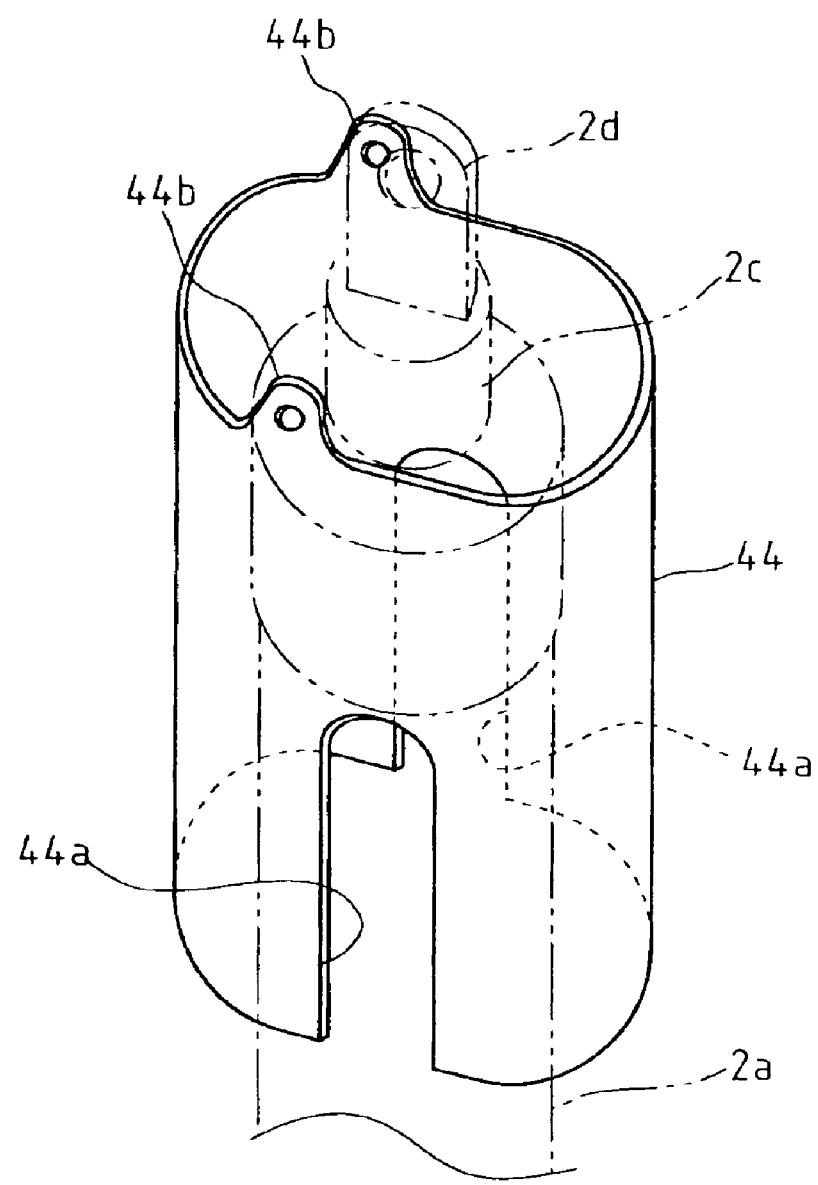
FIG. 18 is a perspective view of the cylinder cover shown in FIG. 16.

Another cylinder cover according to another embodiment will be described with reference to FIGS. 16 to 18. As best shown in FIG. 17, a cylinder cover 44 has a sectionally elliptic shape, whose major axis is disposed in the fore-and-aft direction when lift cylinder 2 is axially viewed, so as to cover the front, rear, left and right of piston rod 2c of lift cylinder 2. The major axis of the sectional elliptic shape of cylinder cover 44 is sufficiently larger than the outer diameter of cylinder casing 2a so as to ensure a gap of a distance L2 between the front and rear ends of cylinder cover 44 and the front and rear ends of cylinder casing 2a, which is large enough to prevent cylinder cover 44 and cylinder casing 2 of lift cylinder 2 from being angled and caught on each other or frictionally sliding against each other when piston rod 2c is extended, as understood from FIG. 13 illustrating cylinder cover 43. Also, the gap smoothly exhausts contamination such as earth and sand entering between lift cylinder 2 and cylinder cover 44.

Furthermore, cylinder cover 44 is formed at lower right and left side surfaces thereof with respective notches 44a in substantially vertically reversed U-like shapes when viewed in side. Due to this configuration, the lower portions of cylinder cover 44 can be considerably elastically widened in the fore-and-aft direction to some degree, thereby enhancing the above-mentioned effect of preventing lift cylinder 2 and cylinder cover 44 from being caught on each other and frictionally sliding against each other when piston rod 2c is extended. Notches 44a also facilitate for easy exhaust of earth and sand or the like from the gap between lift cylinder 2 and cylinder cover 44.

A pair of upwardly protrusions 44b is formed on right and left top ends of cylinder cover 44. Protrusions 44b are pivoted onto protrusion 5a of lift arm 5 by a bolt 45 so that cylinder cover 44 vertically moves substantially integrally with extended piston rod 2c along the axis of lift cylinder 2, similarly to cylinder cover 43.

Cylinder cover 44 is not provided with portions like the cut portion 43a and front opening 43b of cylinder cover 43, but has upward protrusions 44b pivoted onto protrusion 5a of lift arm 5 so that the top end of cylinder cover 44 except upward protrusions 44b becomes considerably low so as to be prevented from interfering with lift arm 5 when piston rod 2 is extended.

Figure 16:
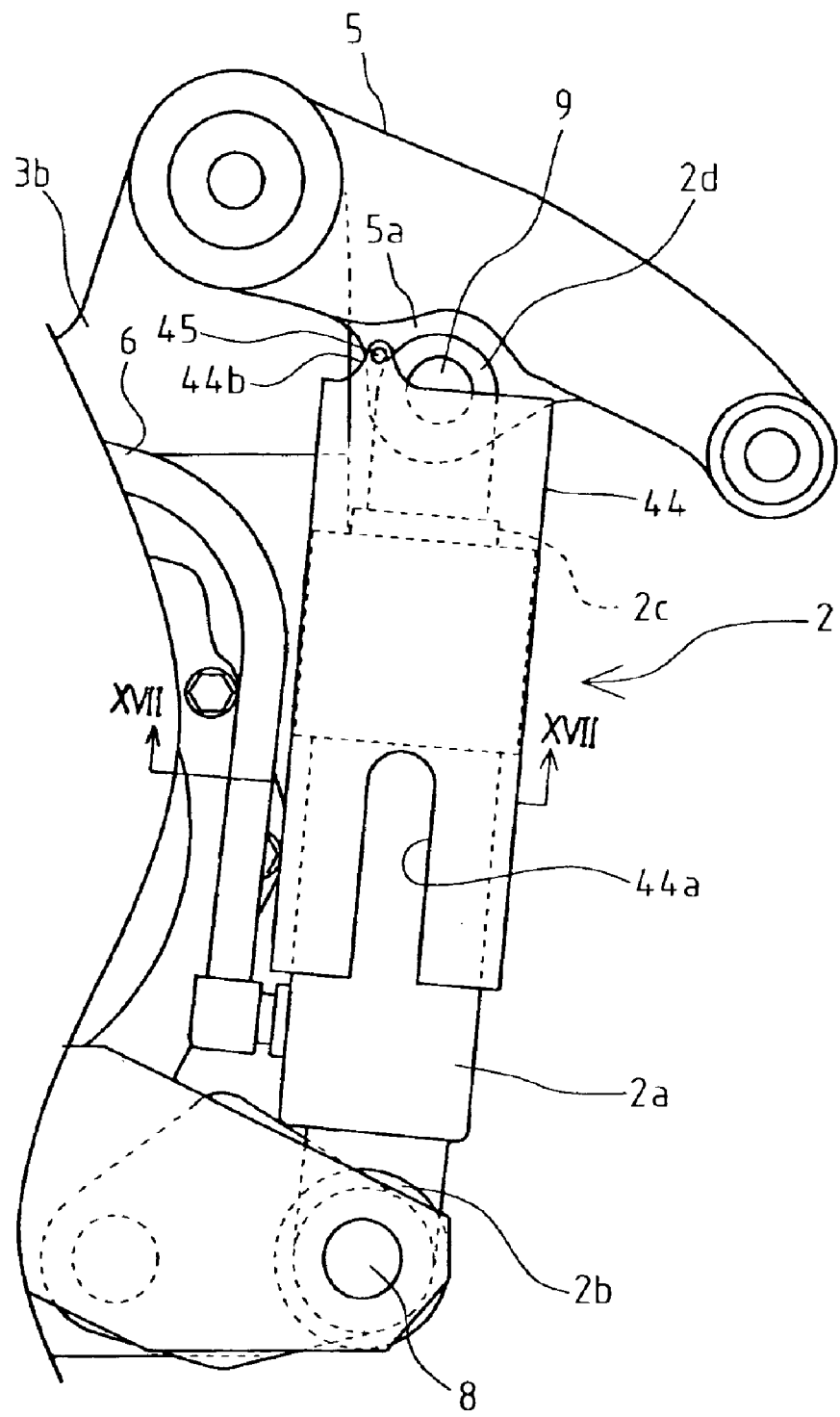
FIG. 16 is a side view of the externally installed hydraulic cylinder with another cylinder cover.

In this way, during the fully upward extension of the extremely contracted piston rod 2c as shown in FIG. 16, piston cover 44 constantly covering piston rod 2c in its all radial directions moves upward substantially integrally with piston rod 2c without interfering with lift arm 5 vertically rotating relative to piston rod 2c, thereby protecting piston rod 2c from sticking and hitting of earth and sand.

Figure 19:
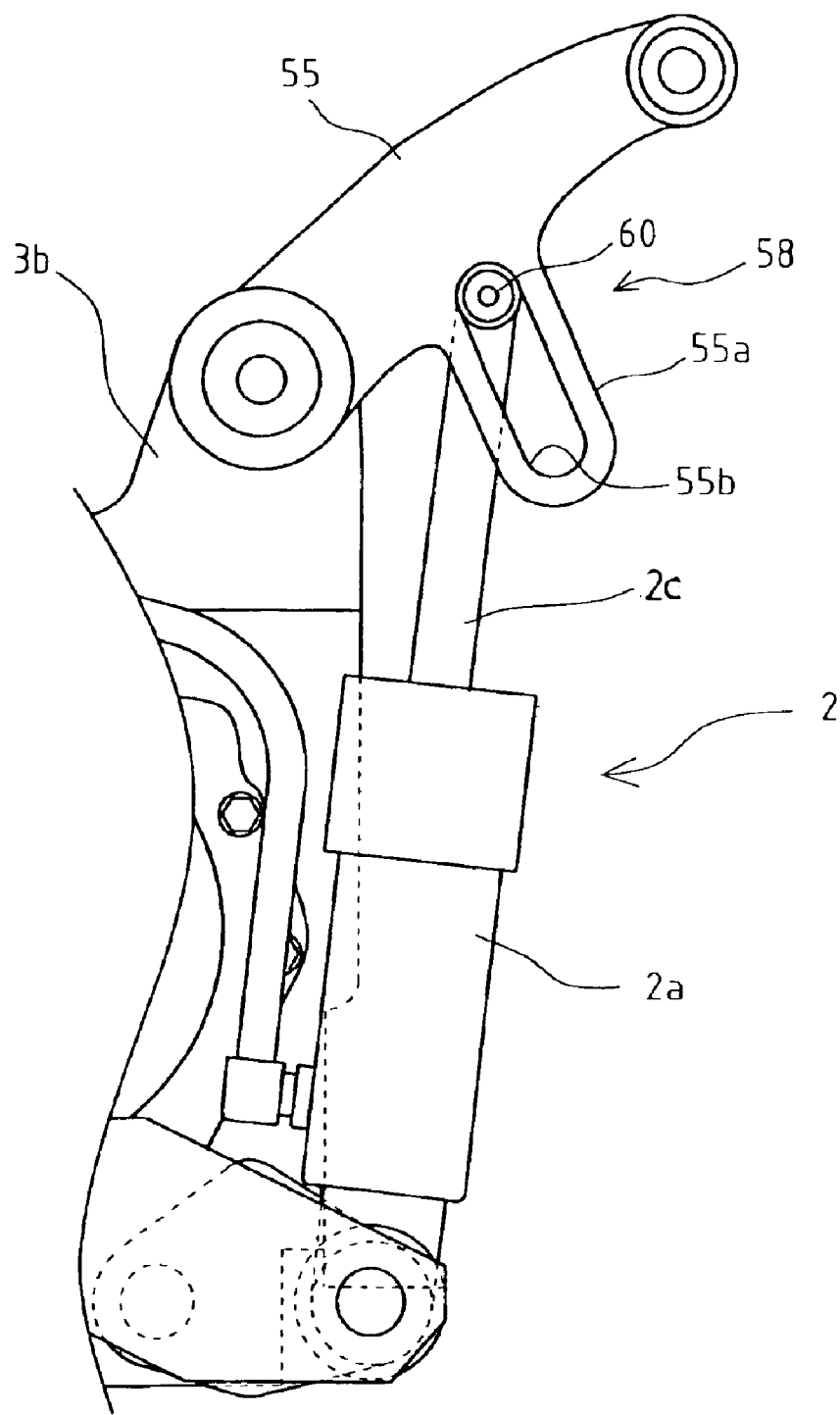
FIG. 19 is a side view of a working machine lifting device according to a third embodiment of the present invention.

Next, a structure for preventing portion 2d of lift cylinder 2 on its rod side pivoted onto lift arm 5 from being subject to concentrative stresses, with reference to FIG. 19.

In the embodiments shown in FIG. 2 and others, the position of pin 9 for vertically rotatably pivoting portion 2d of lift cylinder 2 onto protrusion 5a of lift arm 5 is fixed in protrusion 5a. Since such a pivoting structure of piston rod 2c to lift arm 5 has no flexibility (or, is rigid), load of working machine 120 onto lift arm 5 is transmitted at a considerably large rate through piston rod 2c to the piston of lift cylinder 2. More specifically, when working machine 120 working in a field vertically moves because of rough ground or another reason, lift arms 5 vertically rotate following the vertical movement of working machine 120, thereby applying an undesired extension or contraction force onto piston rod 2c held by hydraulic oil from hydraulic valve 20 and being possible to damage lift cylinder 2. Also, lift arm 5 may be damaged by stress from piston rod 2c. Further, hydraulic valve 20 may be damaged because the pressure of hydraulic oil for lift cylinder is unbalanced. Furthermore, the same problems arise when piston rod 2c whose stroke is directly transmitted to lift arm 5 is telescoped and lift arm 5 suddenly stops.

Therefore, a lift arm 55 shown in FIG. 19, having a longitudinally middle protrusion 55a extended substantially along piston rod 2c, is used instead of lift arm 5 having protrusion 5a. In protrusion 55a is formed a slot 55b elongated along piston rod 2c. A roller 60 is pivoted on the tip of piston rod 2c of lift cylinder 2 so as to suit lift arm 55. Roller 60 is slidably pressed in slot 55b so as to constitute a coupling structure 58 between lift arm 55 and lift cylinder 2.

As far as roller 60 can slide in slot 55b, coupling structure 58 allows lift arm 55 to rotate vertically relative to stationary piston rod 2c, and allows piston rod 2c to telescope relative to stationary lift arm 55. In this way, lift arm 55 and piston rod 2c are allowed to move relative to each other, thereby solving the above problems.

If the vertical rotation of lift arm 55 relative to lift cylinder 2 in reaction to the vertical movement of working machine 120 is too sensitive for roller 60 to slide in slot 55b following lift arm 55, it is thereby possible to cause piston rod 2c and protrusion 55a to be caught on each other. Roller 60 suddenly sliding in slot 55*b* may strike an end of slot 55*b* so as to shock lift cylinder 2, lift arm 55, and working machine 120, at worst. Especially, when working machine 120 is lowered on the ground, lift arm 55 suddenly stops during the contraction of piston rod 2*c*, thereby upwardly rotating lift arm 55 relative to piston rod 2*c*. When grounding working machine 120 is lifted up, piston rod 2*c* is suddenly extended while lift arm 55 being stationary, thereby downwardly rotating lift arm 55 relative piston rod 2*c*. In these situations, the above problem arises.

Figure 20:
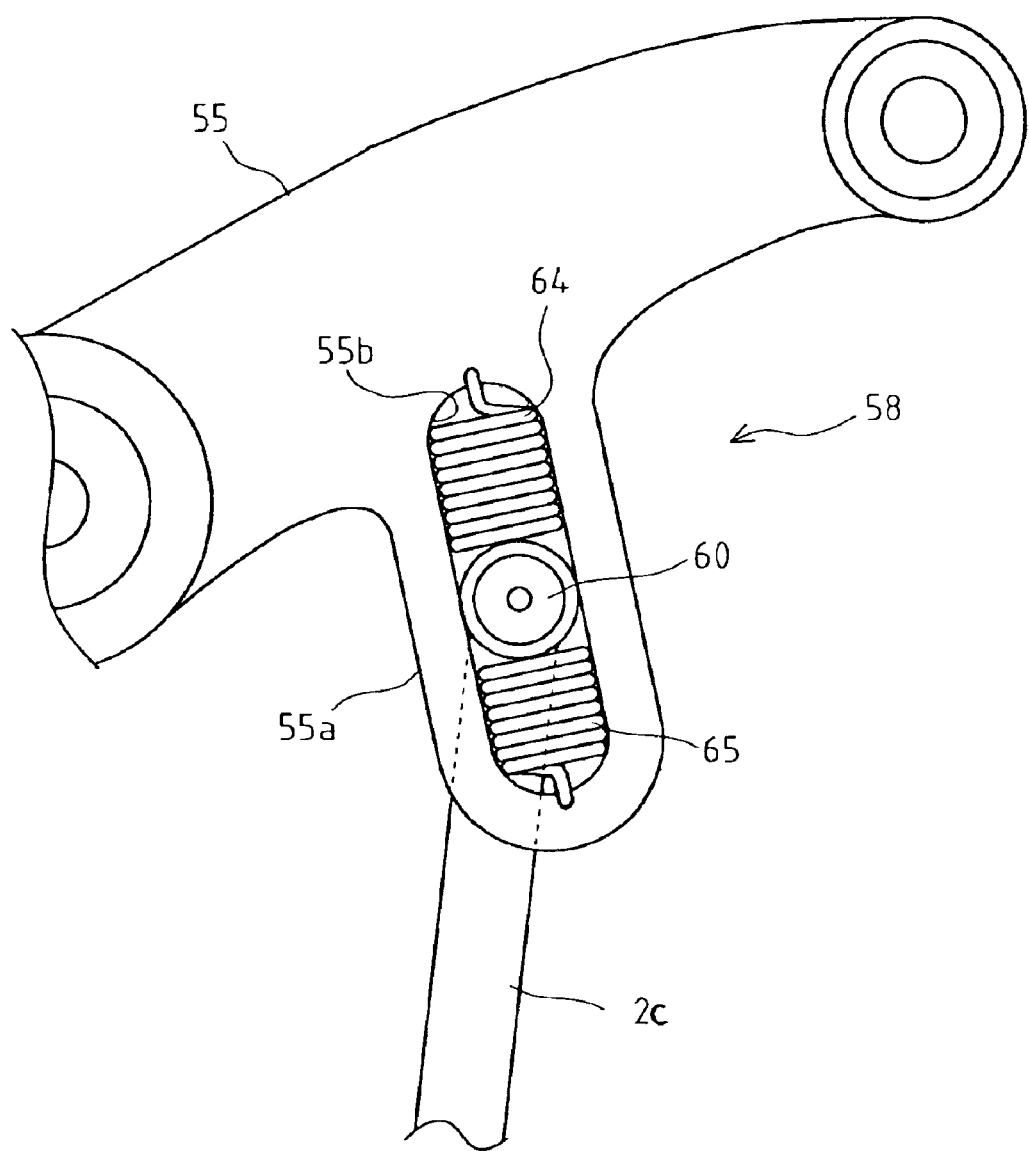
FIG. 20 is a side view of a coupling portion between a lift arm and an externally installed hydraulic lift cylinder in the working machine lifting device of FIG. 19.

Therefore, coupling structure 58 shown in FIG. 20 has a pair of springs 64 and 65 disposed in slot 55*b* so as to cause a biasing force against roller 60 sliding in slot 55*b*. More specifically, the initial position of roller 60 is set at the substantially central area in slot 55*b*, spring 54 is interposed between roller 60 and the upper end of slot 55*b*, and spring 55 between roller 60 and the lower end of slot 55*b*, so that roller 60 is resisted when sliding either upward or downward in slot 55*b*. Accordingly, the upward and downward rotation of lift arm 55 relative to piston rod 2*c* is moderated so as to solve the above problem. This also has a moderation function for avoiding sudden telescoping of piston rod 2*c*.

Either cylinder cover 43 or 44 can be attached to lift arm 55 and lift cylinder 2 having coupling structure 58 therebetween. In this regard, the required thing is only forming a portion (hole) in protrusion 55*a* for pivoting cylinder cover 43 or 44.

INDUSTRIAL APPLICABILITY

As mentioned above, the working machine lifting device of a tractor according to the present invention is useful because externally installed cylinders having large stroke and capacity can be provided when a wide or heavy working machine must be connected to the tractor.

What is claimed is:

1. A working machine lifting device of a tractor, comprising:
    an externally installed hydraulic cylinder disposed on a side of a transmission casing;
    a lift arm rotated by operation of the cylinder; and
    a lower link vertically rotated by rotation of the lift arm and connected to a working machine, wherein a supporting point of the cylinder and a vertically rotating pivot of the lower link are disposed coaxially to each other.

2. The working machine lifting device of a tractor as set forth in claim 1, wherein the hydraulic cylinder and the lower link are rotatably supported on a same pin so as to position the supporting point of the cylinder and the vertically rotating pivot of the lower link on the axis of the pin.

3. The working machine lifting device of a tractor as set forth in claim 2, wherein the pin is supported by the transmission casing and a bracket of a sway chain for checking lateral swing of the lower link.

4. The working machine lifting device of a tractor as set forth in claim 3, wherein the supporting point of the cylinder is disposed nearer to the transmission casing than the supporting position of the pin by the sway chain bracket, and wherein the vertically rotating pivot of the lower link is disposed farther from the transmission casing than the supporting position of the pin by the sway chain bracket.

5. A working machine lifting device of a tractor, comprising:
    an externally installed hydraulic cylinder for lifting a working machine and controlling the attitude of it;
    a valve casing having a first surface;
    a hydraulic valve for supplying hydraulic oil to the cylinder; and
    a pipe disposed in the valve casing so as to communicate ports of the hydraulic valve to each other.

6. The working machine lifting device of a tractor as set forth in claim 5, wherein the pipe in the valve casing is disposed in a space formed in a second surface of the valve casing opposite to the first surface having the hydraulic valve thereon.

7. The working machine lifting device of a tractor as set forth in claim 6, wherein the first surface is a top surface of the valve casing, and the second surface is a bottom surface of the valve casing.

8. The working machine lifting device of a tractor as set forth in claim 6, wherein a plurality of oil bores are formed in the valve casing between the first and second surfaces so as to be extended from the respective ports of the hydraulic valve, and wherein the pipe connects the oil bores to each other.

9. The working machine lifting device of a tractor as set forth in claim 8, wherein the oil bore is vertical, and the pipe is horizontal.

10. A working machine lifting device of a tractor, comprising:
    an externally installed hydraulic cylinder;
    a cylinder cover covering the outer periphery of the cylinder so as to protect the cylinder;
    a lift arm rotated by operation of the cylinder, the lift arm having a portion onto which an upper portion of the cylinder cover is attached; and
    a lower link vertically rotated by rotation of the lift arm and connected to a working machine.

11. The working machine lifting device of a tractor as set forth in claim 10, wherein while the cylinder is cylindrical, the cylinder cover is substantially square when the cylinder is axially viewed.

12. The working machine lifting device of a tractor as set forth in claim 10, wherein the cylinder cover is formed with a notch substantially parallel to the axis of the hydraulic cylinder.

13. The working machine lifting device of a tractor as set forth in claim 12, wherein the notch having a substantially vertically reversed U-like shape and open downward is disposed below the cylinder cover.

14. The working machine lifting device as set forth in claim 10, wherein an upper portion of the cylinder cover is cut so as to be prevented from interfering with the lift arm so that a position of the top end of the cut upper portion of the cylinder cover when abutting against the lift arm defines the limit of extension or contraction of a piston rod of the cylinder.

15. A working machine lifting device of a tractor, comprising:
    an externally installed hydraulic cylinder having a piston rod;
    a lift arm rotated by operation of the cylinder, the lift arm having a longitudinally intermediate attaching portion onto which the cylinder is attached, and a slot formed in the attaching portion;
    a roller provided on a tip of the piston rod and slidably inserted in the slot; and
    a lower link vertically rotated by rotation of the lift arm and connected to a working machine.

16. The working machine lifting device of a tractor as set forth in claim 15, further comprising:
    biasing means disposed in the attaching portion so as to bias the roller toward the center of the slot.

17. The working machine lifting device of a tractor as set forth in claim 7, wherein a plurality of oil bores are formed in the valve casing between the first and second surfaces so as to be extended from the respective ports of the hydraulic valve, and wherein the pipe connects the oil bores to each other.

18. The working machine lifting device of a tractor as set forth in claim 17, wherein the oil bore is vertical, and the pipe is horizontal.

* * * * *